(12) United States Patent
Linga et al.

(10) Patent No.: US 11,556,642 B2
(45) Date of Patent: Jan. 17, 2023

(54) CODE MONITORING AND RESTRICTING OF EGRESS OPERATIONS

(71) Applicant: BluBracket, Inc., Palo Alto, CA (US)

(72) Inventors: Prakash Linga, San Jose, CA (US); Ajay K. Arora, Redwood City, CA (US); Vladimir Buzuev, Castro Valley, CA (US)

(73) Assignee: BluBracket, Inc., Palo Alto, CA (US)

( * ) Notice: Subject to any disclaimer, the term of this patent is extended or adjusted under 35 U.S.C. 154(b) by 10 days.

(21) Appl. No.: 17/178,233

(22) Filed: Feb. 17, 2021

(65) Prior Publication Data
US 2021/0255851 A1    Aug. 19, 2021

Related U.S. Application Data

(60) Provisional application No. 62/978,242, filed on Feb. 18, 2020, provisional application No. 62/978,245, (Continued)

(51) Int. Cl.
| | |
|---|---|
| *G06F 21/56* | (2013.01) |
| *G06F 21/54* | (2013.01) |
| *G06F 8/71* | (2018.01) |
| *G06F 21/62* | (2013.01) |
| *G06F 21/55* | (2013.01) |
| *G06F 8/70* | (2018.01) |
| *G06F 21/64* | (2013.01) |

(Continued)

(52) U.S. Cl.
CPC .............. *G06F 21/563* (2013.01); *G06F 8/70* (2013.01); *G06F 8/71* (2013.01); *G06F 21/31* (2013.01); *G06F 21/54* (2013.01); *G06F 21/554* (2013.01); *G06F 21/604* (2013.01); *G06F 21/62* (2013.01); *G06F 21/629* (2013.01); *G06F 21/6218* (2013.01); *G06F 21/6227* (2013.01); *G06F 21/6281* (2013.01); *G06F 21/64* (2013.01); *H04L 63/102* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 6,609,115 B1 * | 8/2003 | Mehring | G06Q 20/382 705/64 |
| 6,957,366 B1 * | 10/2005 | McDonald | G06F 11/3688 717/124 |

(Continued)

OTHER PUBLICATIONS

Povey, Dean. "Optimistic security: a new access control paradigm." [Online], 1999 [Retrieved on: Jul. 30, 2022], In Proceedings of the 1999 workshop on New security paradigms, pp. 40-45, Retrieved from: < https://dl.acm.org/doi/odf/10.1145/335169.335188 > (Year: 1999).

*Primary Examiner* — Qing Chen

(57) ABSTRACT

One example method of operation may include identifying an attempted action taken to code, determining whether to block the attempted action based on one or more of user profile access rights assigned to a user profile and a code permission assigned to the code, and responsive to determining whether to block the attempted action, blocking one or more of access to the code, access to a file containing the code and a port used to connect to a server hosting the code.

20 Claims, 25 Drawing Sheets

Related U.S. Application Data filed on Feb. 18, 2020, provisional application No. 62/978,248, filed on Feb. 18, 2020, provisional application No. 62/978,240, filed on Feb. 18, 2020, provisional application No. 62/978,238, filed on Feb. 18, 2020, provisional application No. 62/978,250, filed on Feb. 18, 2020.

(51) Int. Cl.
*G06F 21/60* (2013.01)
*H04L 9/40* (2022.01)
*G06F 21/31* (2013.01)

(56) References Cited

U.S. PATENT DOCUMENTS

| | | | | |
|---|---|---|---|---|
| 7,076,496 B1* | 7/2006 | Ruizandrade | ............ | G06F 8/71 |
| | | | | 707/999.102 |
| 8,432,570 B1 | 4/2013 | Couvering | | |
| 8,819,856 B1 | 8/2014 | Tiffe et al. | | |
| 9,449,181 B1* | 9/2016 | Umapathy | ............ | G06F 21/00 |
| 10,354,093 B1* | 7/2019 | Farber | ................ | G06F 21/6218 |
| 10,768,929 B1* | 9/2020 | Turner | ...................... | G06F 8/65 |
| 2005/0097364 A1* | 5/2005 | Edeki | ...................... | G06F 21/31 |
| | | | | 726/4 |
| 2005/0273600 A1* | 12/2005 | Seeman | ............ | G06F 21/6227 |
| | | | | 713/160 |
| 2006/0048230 A1 | 3/2006 | Hameau et al. | | |
| 2006/0080546 A1 | 4/2006 | Brannon et al. | | |
| 2007/0061782 A1 | 3/2007 | Schreiner et al. | | |
| 2007/0130149 A1* | 6/2007 | Kelso | .................. | G06F 21/6218 |
| 2007/0169071 A1* | 7/2007 | Martin | .................... | G06F 9/468 |
| | | | | 717/166 |
| 2008/0288330 A1 | 11/2008 | Hildebrand et al. | | |
| 2009/0293121 A1 | 11/2009 | Bigus et al. | | |
| 2009/0328188 A1* | 12/2009 | Raymer | ............. | G06F 21/6218 |
| | | | | 726/14 |
| 2010/0007489 A1 | 1/2010 | Misra et al. | | |
| 2012/0278902 A1* | 11/2012 | Martin | ...................... | G06F 8/65 |
| | | | | 717/172 |
| 2014/0090012 A1 | 3/2014 | Lim | | |
| 2014/0283127 A1 | 9/2014 | Chacko et al. | | |
| 2015/0046463 A1* | 2/2015 | Mohan | .................. | G06F 16/316 |
| | | | | 707/741 |
| 2015/0067861 A1 | 3/2015 | Foley et al. | | |
| 2015/0082274 A1 | 3/2015 | Resig et al. | | |
| 2016/0285835 A1 | 9/2016 | Linga et al. | | |
| 2016/0352748 A1* | 12/2016 | Hwang | .................. | H04L 63/145 |
| 2017/0103192 A1* | 4/2017 | Hussey | .................... | G06F 21/57 |
| 2017/0366551 A1* | 12/2017 | Brandwine | ............. | H04L 47/70 |
| 2018/0097787 A1 | 4/2018 | Murthy et al. | | |
| 2018/0129497 A1 | 5/2018 | Biddle et al. | | |
| 2018/0139210 A1* | 5/2018 | Gideon, III | ........... | H04L 63/107 |
| 2019/0073455 A1* | 3/2019 | Chen | ..................... | G06F 11/362 |
| 2019/0220542 A1 | 7/2019 | Estruch Tena | ........ | G06F 21/604 |
| 2019/0327271 A1* | 10/2019 | Saxena | .................. | H04L 63/104 |
| 2020/0104248 A1* | 4/2020 | Yim | ..................... | G06F 11/3672 |
| 2020/0104519 A1* | 4/2020 | Farber | .................. | H04L 63/102 |
| 2020/0218535 A1 | 7/2020 | Alomari | | |
| 2020/0242536 A1 | 7/2020 | Schwantes | | |
| 2021/0097024 A1* | 4/2021 | Miller | ................ | G06F 16/1824 |
| 2021/0243223 A1 | 8/2021 | Arora et al. | | |
| 2021/0247976 A1 | 8/2021 | Masis et al. | | |

\* cited by examiner

CODE MONITORING AND RESTRICTING OF EGRESS OPERATIONS

CROSS-REFERENCE TO RELATED APPLICATIONS

This non-provisional application claims priority to U.S. provisional application No. 62/978,238 and entitled, "CODE PERMISSIONS AND SELECTIVE ACCESS," and U.S. provisional application No. 62/978,240 and entitled, "CODE ACCESS DOCUMENTATION AND AUDITING," and U.S. provisional application No. 62/978,242 entitled, "CODE TRACING AND CODE EVENT IDENTIFICATION," and U.S. provisional application No. 62/978,245 entitled, "CODE TRACING AND REPORTING," and U.S. provisional application No. 62/978,248 entitled, "CODE EGRESS MANAGEMENT," and U.S. provisional application No. 62/978,250 entitled, "IDENTIFYING CODE ACCESS VIOLATIONS AND LIMITING CODE PRIVILEGES," all of which were filed on Feb. 18, 2020 and are each incorporated herein by reference in their entireties.

BACKGROUND

Conventionally, software development utilizes an access portal to reach the code source whether it resides on an internal enterprise platform in a remote cloud location, such as 'GITHUB' or other third party cloud development sources. A username and/or password is not a viable solution to managing an entire team of developers and their respective access rights. Developers know all the vulnerabilities and can equally be a threat as well as a valuable asset to the team of developers and the code development project.

On the other hand, the strict restrictions which prevent access to various lower level employees or other contractors which are not part of the elite circle of senior developers, only limits the growth potential of a development team since many developers may be performing both less important and more important development tasks. In such circumstances, the developer may require access to the portions of code which are deemed sensitive and which the developer may not currently have access to at a particular time.

One common concern is how to provide a fundamental level of code access without permitting any unnecessary rights or privileges to the code development personnel. For example, when a low-level developer needs to execute code to perform fundamental functions, however, the additional privileges, such as viewing, copying, changing, saving, etc., are all not necessary functions for that particular user profile, then the ideal scenario would include access to perform tests and related operations without any additional privileges.

SUMMARY

Example embodiments of the present application provide at least a method that includes identifying a code access event associated with a code segment, determining whether one or more portions of the code segment require code access permissions, determining whether one or more credentials of a profile associated with the code access event have a required code access credential necessary to permit the code access event, and assigning limited access to the code segment and the profile based on the one or more credentials associated with the code access event Another example embodiment may include an apparatus that includes a processor configured to identify a code access event associated with a code segment, determine whether one or more portions of the code segment require code access permissions, determine whether one or more credentials of a profile associated with the code access event have a required code access credential necessary to permit the code access event, and assign limited access to the code segment and the profile based on the one or more credentials associated with the code access event.

Still another example embodiment may include a non-transitory computer readable storage medium configured to store instructions that when executed cause a processor to perform, identifying a code access event associated with a code segment, determining whether one or more portions of the code segment require code access permissions, determining whether one or more credentials of a profile associated with the code access event have a required code access credential necessary to permit the code access event, and assigning limited access to the code segment and the profile based on the one or more credentials associated with the code access event.

Yet another example embodiment may include a method that includes identifying a code segment accessed during a code access event, scanning code of the code segment to identify a degree of sensitivity of the code, appending a code access annotation to the code segment based on detected actions performed to the code during the code access event, and updating a code log to identify the code access annotation.

Still yet a further example embodiment may include an apparatus that includes a processor configured to identify a code segment accessed during a code access event, scan code of the code segment to identify a degree of sensitivity of the code, append a code access annotation to the code segment based on detected actions performed to the code during the code access event, and update a code log to identify the code access annotation.

Still another example embodiment may include a non-transitory computer readable storage medium configured to store instructions that when executed cause a processor to perform identifying a code segment accessed during a code access event, scanning code of the code segment to identify a degree of sensitivity of the code, appending a code access annotation to the code segment based on detected actions performed to the code during the code access event, and updating a code log to identify the code access annotation.

Still another example embodiment may include a method that includes determining one or more of a file type and a code segment accessed during a code access event, identifying code origin information appended to the code segment during previous code access events, appending an updated code access location to the code segment identifying the current code access event and a current code location, and applying one or more code access restrictions to the code segment based on the current code location.

Still yet another example embodiment may include an apparatus that includes a processor configured to determine one or more of a file type and a code segment accessed during a code access event, identify code origin information appended to the code segment during previous code access events, append an updated code access location to the code segment identifying the current code access event and a current code location, and apply one or more code access restrictions to the code segment based on the current code location.

Still another example embodiment may include a non-transitory computer readable storage medium configured to store instructions that when executed cause a processor to perform determining one or more of a file type and a code segment accessed during a code access event, identifying code origin information appended to the code segment during previous code access events, appending an updated code access location to the code segment identifying the current code access event and a current code location, and applying one or more code access restrictions to the code segment based on the current code location.

Still another example embodiment may include a method that includes identifying a plurality of code access events over a period of time, determining whether any of the code access events included any sensitive code segments, determining whether any of the code access events which included the sensitive code segments were unauthorized, and performing one or more automated actions to restrict code access permissions of one or more user profiles.

Still yet another example embodiment may include an apparatus that includes a processor configured to identify a plurality of code access events over a period of time, determine whether any of the code access events included any sensitive code segments, determine whether any of the code access events which included the sensitive code segments were unauthorized, and perform one or more automated actions to restrict code access permissions of one or more user profiles.

Still another example embodiment may include a non-transitory computer readable storage medium configured to store instructions that when executed cause a processor to perform identifying a plurality of code access events over a period of time, determining whether any of the code access events included any sensitive code segments, determining whether any of the code access events which included the sensitive code segments were unauthorized, and performing one or more automated actions to restrict code access permissions of one or more user profiles.

Still another example embodiment may include a method that includes identifying an attempted action taken to code, determining whether to block the attempted action based on one or more of user profile access rights assigned to a user profile and a code permission assigned to the code, and responsive to determining whether to block the attempted action, blocking one or more of access to the code, access to a file containing the code and a port used to connect to a server hosting the code.

Still another example embodiment may include an apparatus that includes a processor configured to identify an attempted action taken to code, determine whether to block the attempted action based on one or more of user profile access rights assigned to a user profile and a code permission assigned to the code, and responsive to determination as to whether to block the attempted action, block one or more of access to the code, access to a file containing the code and a port used to connect to a server hosting the code.

Still another example embodiment may include a non-transitory computer readable storage medium configured to store instructions that when executed cause a processor to perform identifying an attempted action taken to code, determining whether to block the attempted action based on one or more of user profile access rights assigned to a user profile and a code permission assigned to the code, and responsive to determining whether to block the attempted action, blocking one or more of access to the code, access to a file containing the code and a port used to connect to a server hosting the code.

DETAILED DESCRIPTION

Figure 1A:
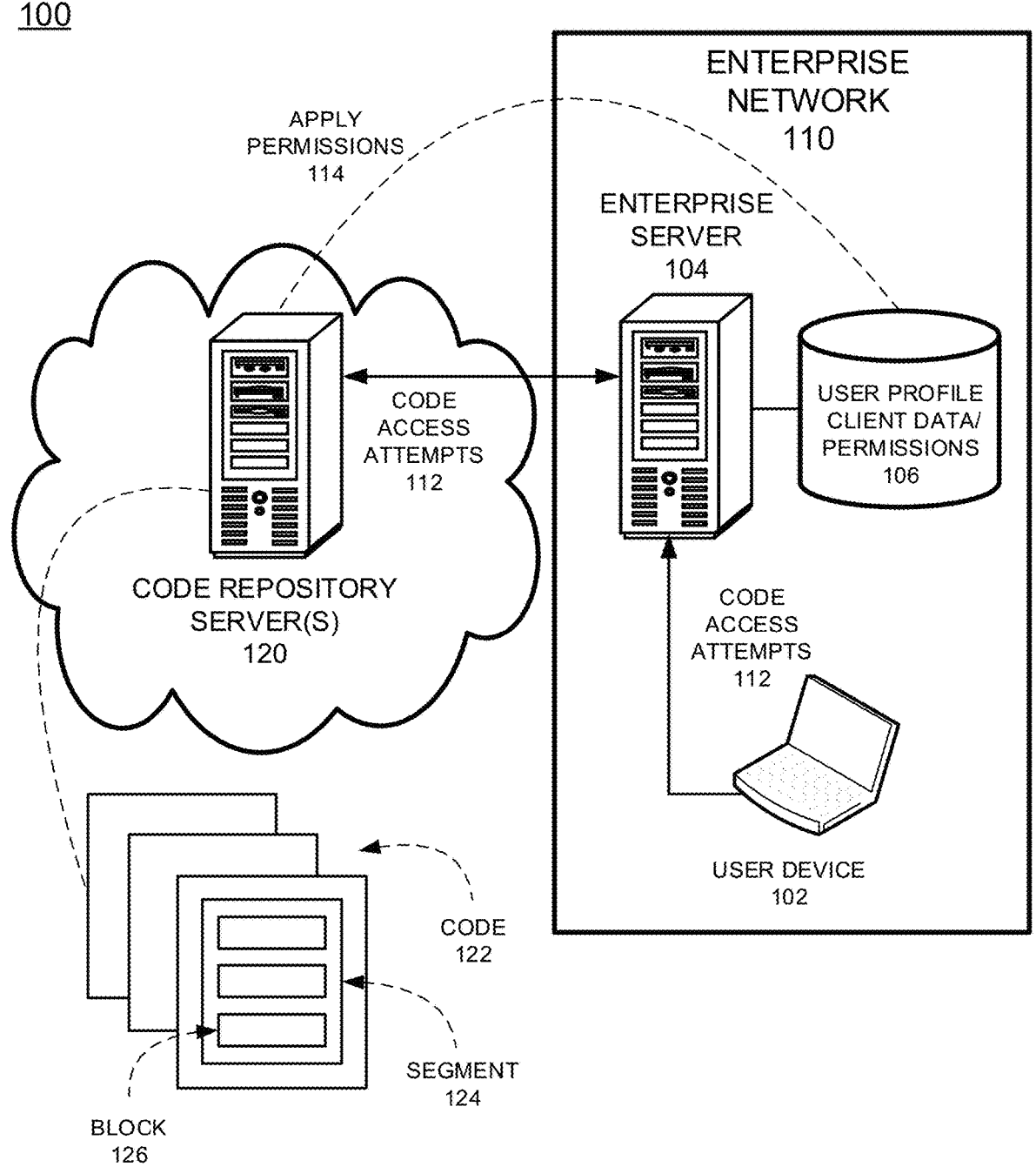
FIG. 1A illustrates an example code limited access management configuration according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide ways to enforce software code access and permissions to protect code from unauthorized sources attempting to gain access to the code. Code access, in general, may invoke a managerial event, such as an automated identification procedure to identify whether the code attempting to be accessed, or more specifically, the code segment that was specifically accessed, is permitted to be accessed, altered, etc. Also, a determination may be made as to whether the code was tampered, copied, etc., especially when the profile associated with the access attempt during the code access event has limited rights to access and modify the code.

In one example, any action by a particular user device profile or user profile, which identifies a particular individual and/or device, and which is currently logged into the code repository application, may be screened, corroborated/intercepted by a managerial agent application function. Any known policies are applied on the fly during such events or periodically during audits of such events which may be performed at certain intervals of time during an active code access session. For example, a policy may be applied at the initial access event, such as when credentials are received and access is granted. The policies may be recursively applied or checked by the managerial agent at the expiration of certain periods of time, such as every 10 minutes. The policies may be applied by attempting to identify a device being used as recognized/not recognized, an amount of code access attempts, such as a number of code segments, a number of code files, a total amount of code accessed (e.g., measured in bytes). Other audited actions may be a number of modifications made, measured in bytes or individual changes saved. The criteria for identifying the access compliance measures applied during the policy enforcement efforts may be based on numerical thresholds of bytes, numbers of changes, lines of code, numbers of files, etc.

According to one example, one specific function may be to select a limited portion of the total available code which is identified as authorized based on a user profile permission or other monitoring and management criteria. Further to the code access operation and application of permissions/restrictions, the code may have selective access applied to certain code blocks/segments based on the rights, statuses, and/or other credentials associated with the user profiles or user devices accessing the code. For example, within a certain defined code access may include the 'code' 122 which defines all the code related to the recent access operation. The code may be partitioned into segments 124, which are sub-portions of the code. Within a code segment 124 may be a code block 126, which is identified as the most fundamental amount of code described with reference to the examples described in the example embodiments.

FIG. 1A illustrates an example code access network configuration according to example embodiments. Referring to FIG. 1A, the network 100 includes an enterprise network 110 which represents a location where one or more user managed devices 102 may attempt to access 112 a code repository on a local enterprise server 104 and/or a remote code repository server 120 to access stored code. The credentials 106 may be based on a user profile or other credential management procedure, and may be stored in a database where the access permissions are identified and granted/denied. The code access attempts 112 may also be forwarded to a code repository server 120 in the cloud and permissions may be applied based on the stored credentials 106. Once access is granted the code 122 may be accessed, or a code segment 124 or even a code block 126, which is a sub-set of a segment 124 depending on how the permissions 114 are enabled.

Figure 1B:
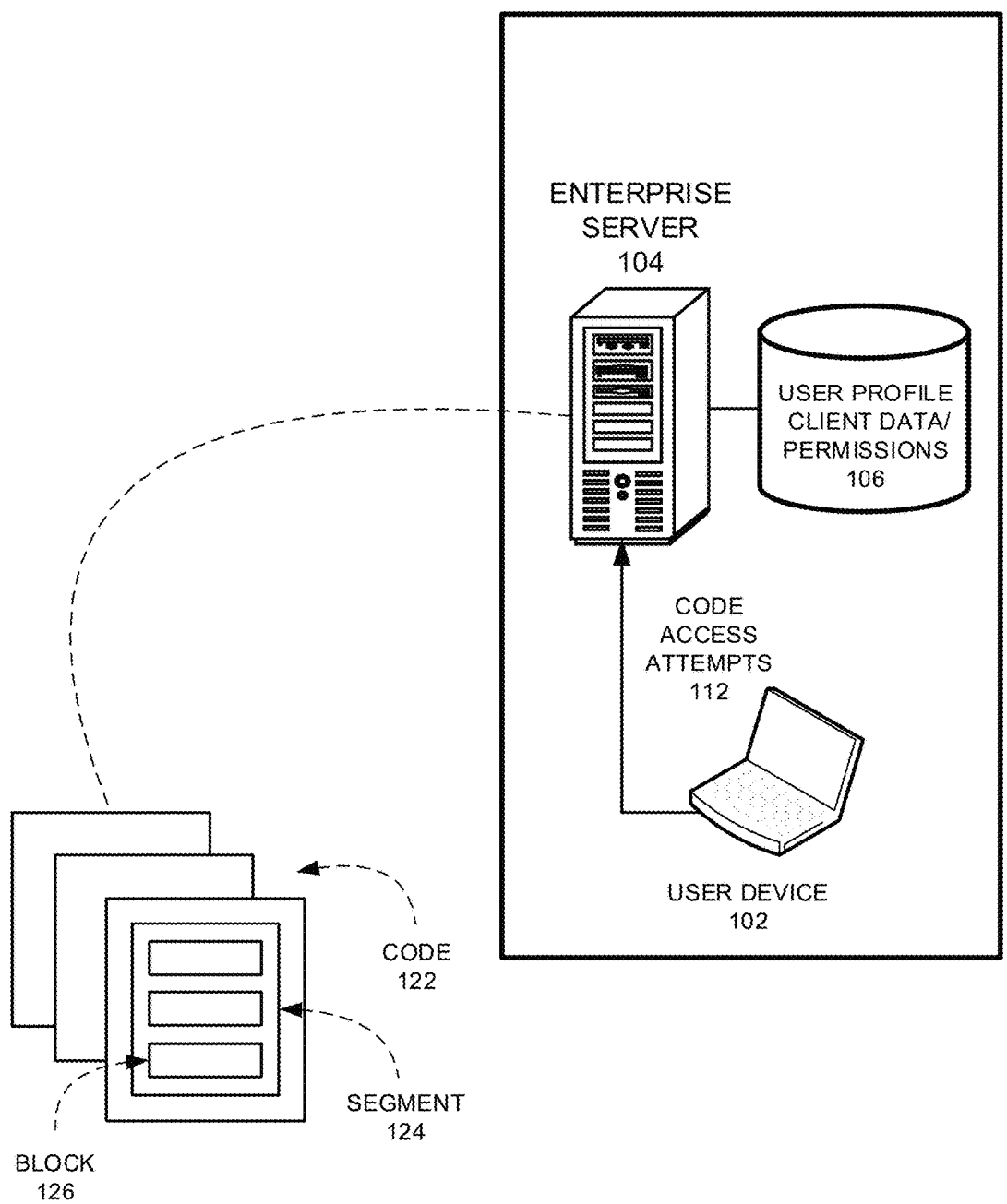
FIG. 1B illustrates an alternative example code limited access configuration according to example embodiments.

FIG. 1B illustrates another example of a code access network configuration according to example embodiments. Referring to FIG. 1B, the example 150 provides accessing code in a code repository which is stored and managed by the enterprise network 110. In this example, the code is not stored in the cloud or a remote network and is instead stored locally and managed internally.

Figure 1C:
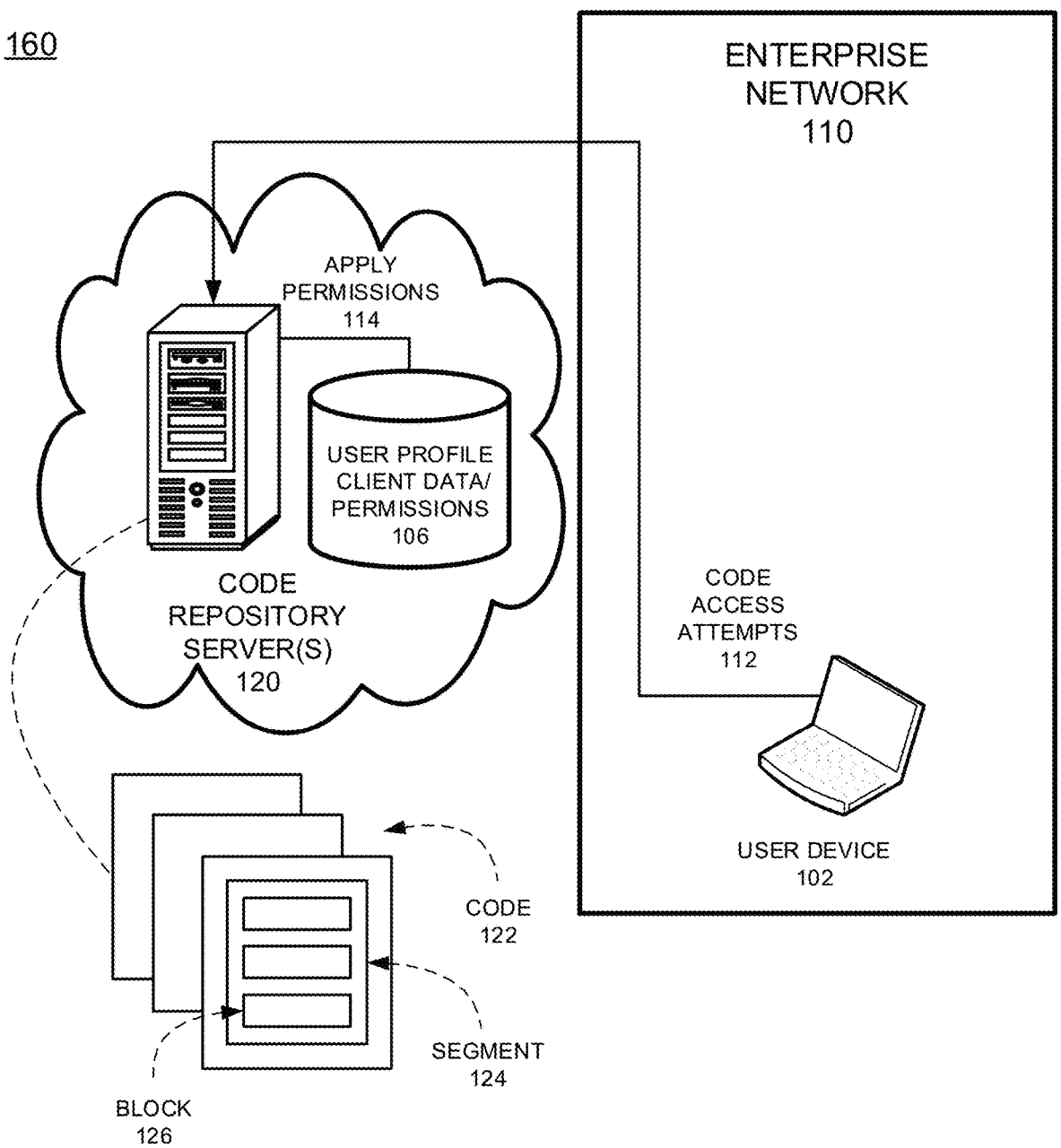
FIG. 1C illustrates another alternative example code limited access configuration according to example embodiments.

FIG. 1C illustrates yet another example code access network configuration according to example embodiments. Referring to FIG. 1C, the configuration 160 includes a code repository 120 in the cloud and not in the enterprise network 110. The code access attempts 112 are forwarded to the remote site 120 and the permissions 106 are applied 114 in the cloud network, which maintains the registration information and the access information necessary to obtain access to the code 122. The servers which maintain the code or provide access to the code may be one and the same and may be in the cloud, in a local network or both.

In one example, an agent may be installed on a user device 102 to maintain constant communication with an agent application on the enterprise server 110. An identity of a user device may be confirmed from credentials which are stored on the device and forwarded during an access attempt. For example, a personal access token may be required to obtain access to the code repository. A software source code security function may be stored in the third party cloud code source. The agent application may be periodically auditing the user device 102 to ensure the permissions are active and the actions taken are consistent with the permissions associated with that particular user device 102. In one example of tracking code and code events, a code copy may be known to exist in a code repository based on a data file directory and/or data files containing the code in a particular at a particular storage location. In one example of tracking code and code "copy" permissions, a code copy may be detected between an enterprise repository and a data file directory and/or data files containing the code at a particular storage location.

In another example, the access levels may include full access with administrative capabilities to modify code, source code, other types of related code, access various libraries and sites including multiple test sites and/or backup sites. Another level of access may include the ability to view and access all of the code but not make changes to the code except for designated portions associated with a user profile of the access event. Another type of access may be a basic and most fundamental access option which includes permitting access to the system test platform and not the main source code, however, the code may be blurred or invisible or not accessible and only certain testing platform functions may be accessible, such as testing procedures which are stored separately from the source code, such as a testing module or "container". Those testing procedures may be executed to test the code, compile the code and receive results, however, being able to change the code, view the code and access certain code portions may be wholly inaccessible by such basic access level. Conventional approaches may manually split the repositories into multiple repositories whenever possible. This approach can be cumbersome and difficult to manage and thus layering permissions on top of the existing repositories is more logical for added security measures.

Figure 1D:
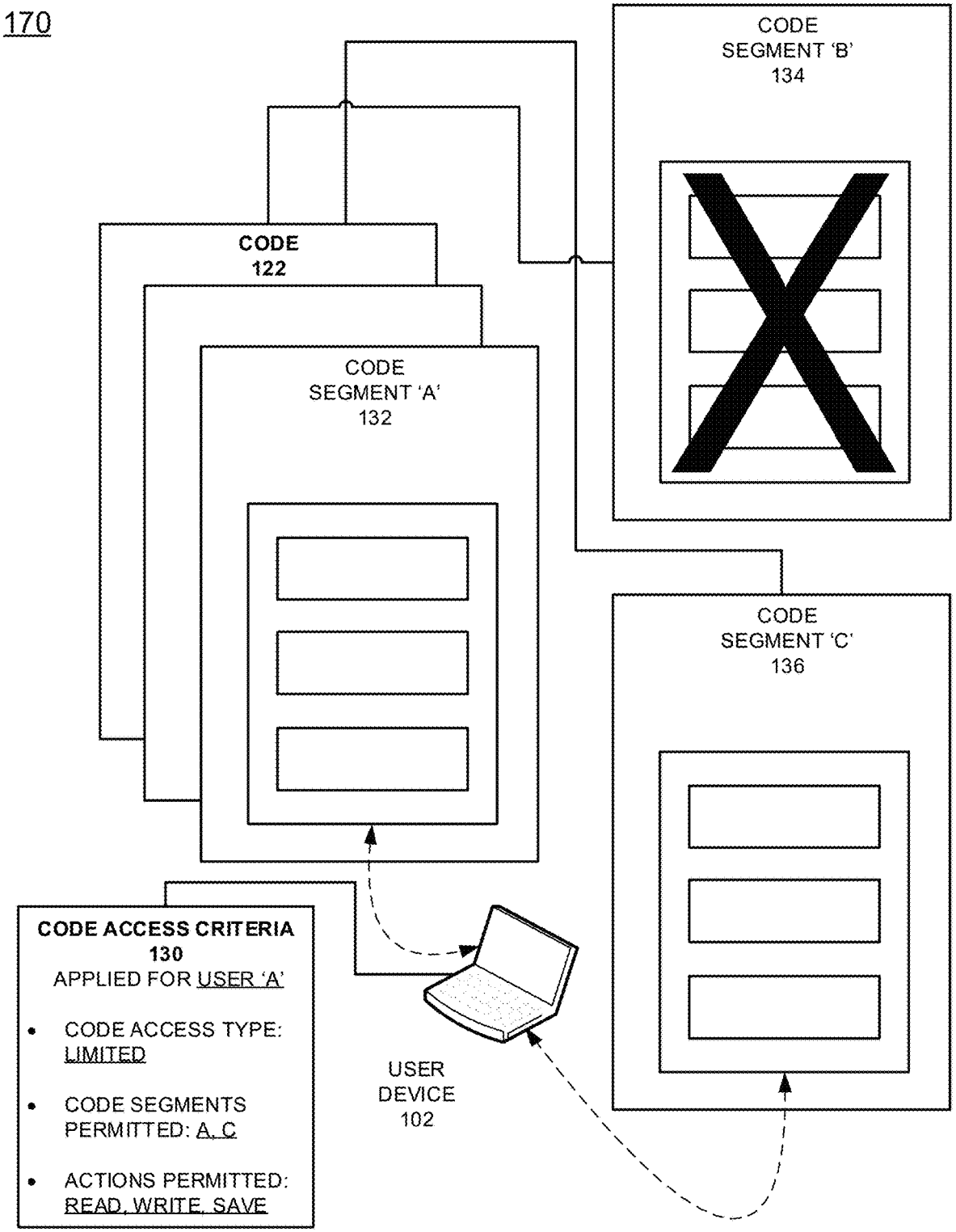
FIG. 1D illustrates an example limited access code access operation performed by a user device according to example embodiments.

FIG. 1D illustrates an example limited access code access operation performed by a user device according to example embodiments. Referring to FIG. 1D, the example configuration 170 illustrates how a user device that has received partial access to code may be subject to code access criteria 130 which is managed by a server managing the code access and monitoring code access events. In this example, the user device 102 has received limited access to the code 122, by having code segments 'A' 132 and 'C' 136 accessible and not having access to the segment 'B' 134. The access criteria is assigned to the device/user profile. The access is limited which indicates that not all types of actions can be taken, for example, the device 102 may not be able to copy or delete code, however, the profile may be able to access, view, read, write and save changes, as identified from the criteria 130. The other portions of the code, such as segment 'B' may be accessible and visible, however without any type of modification rights. Alternatively, the non-permitted code may be invisible to the profile/device 102 as access may be denied entirely.

Figure 1E:
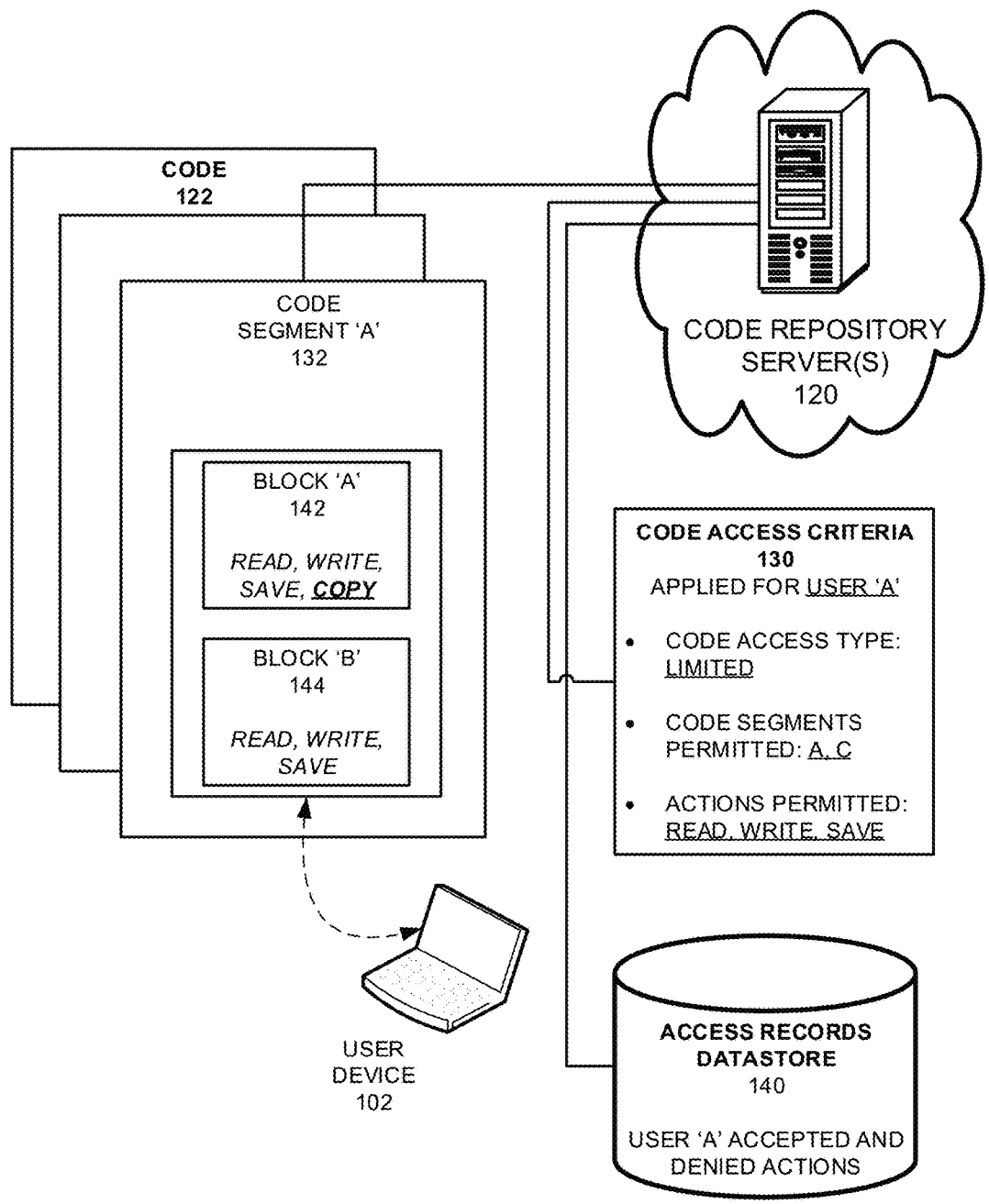
FIG. 1E illustrates an example limited access code access recording and management operation according to example embodiments.

FIG. 1E illustrates an example limited access code access recording and management operation according to example embodiments. Referring to FIG. 1E, the example 180 includes applying the profile access rights (criteria) to the code access system. The access will remain limited, the segments of code are limited and the actions permitted are limited. The example includes accessing code segment 'A' 132 and performing a read, write, and save operation to both sub-portions including block 'A' 142 and block 'B' 144. The example also includes attempting a copy operation to block 'A' 142, which is flagged by the code repository server 120, which in this example is enforcing the limited access rights, however, any device could enforce the rights including an agent operating on the user device 102. The copy operation is not permitted in this example. Once the permitted and non-permitted actions are completed, the datastore 140 may store the access time, date, user profile, device profile, actions attempted, actions successful, actions rejected, etc.

Figure 1F:
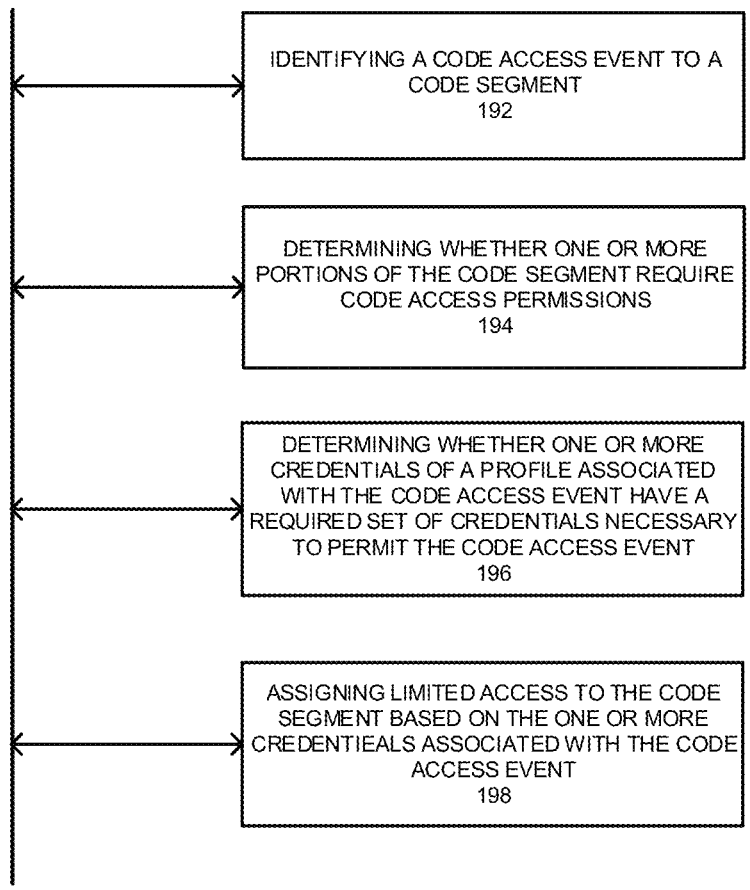
FIG. 1F illustrates an example flow diagram of an example process for providing limited code access according to example embodiments.

FIG. 1F illustrates an example flow diagram of an example process for providing limited code access according to example embodiments. Referring to FIG. 1F, one example 190 may include identifying a code access event associated with a code segment 192, and determining whether one or more portions of the code segment require code access permissions 194. The code may have separately stored portions or commonly stored portions separated by different files or access credential requirements. The portions of code may be referred to as code segments. The code segments may have blocks which are accessed to work and modify line-by-line code and in this example are the most fundamental portion of code, and which can be tracked, monitored, controlled and have limited access applied. The process may also include determining whether one or more credentials of a profile associated with the code access event have a required code access credential necessary to permit the code access event 196. The credentials may be based on assigned rights of the profile, a user device hardware profile, a network address, historical access information, etc. The process may also include assigning limited access to the code segment and the profile based on the one or more credentials associated with the code access event 198. The profile may be paired with the credentials during the login or access process. The credentials may be collected from various different sources and used to comply with the access rights at any given time. If the credential information cannot be collected or some of the information is not available during access times, the access rights can be severely limited.

When one or more portions of the code segment require code access permissions, the process may include assigning one or more of a limited view permission, a limited modification permission, and no access permission, to the one or more credentials and permitting the code access event. Also, the limited access is assigned to one or more blocks of code of the code segment, and the limited access permits access to the one or more blocks of code but not all blocks of code of the code segment. Generally, most profiles will not receive access to all portions of the code. The process may also include assigning the limited access to the code segment by permitting the code segment to be compiled and executed by a user device associated with the one or more credentials and the profile while not providing access to the code segment code. The one or more credentials include one or more of a token, a password, a device hardware address, a network address, and a confirmation of a previous access operation. The process may include determining whether to block or permit the code access event based on profile access permissions associated with the profile, and permitting the profile to access one or more code segments among a plurality of additional code segments. The process may also include creating a log of actions performed to the one or more code segments, and applying the log as a new credential to the profile.

Example embodiments provide ways to enforce software code access and modification to protect code from unauthorized sources and to track the use of the code on developer devices 'workstations'. Further to code access operations and application of permissions/restrictions to the code, the code may be accessed and then annotated, tracked, modified, etc. Also, the code's access and changes may be stored to create a code history throughout the access operations both in the enterprise and the cloud. This may include access and changes associated with devices and user profiles/devices associated with accessing the code. One example includes identifying which devices accessed the code, what portions of the code are permitted to be accessed, annotating the actions taken by certain user profiles/devices. For example, user 'A', device 'ABC', at a time 10:01 AM, added certain attributes, copied, saved, updated, code segments 'A' and 'B' and sub-blocks 'DEF' and 'XYZ', etc. Also, identifying other access efforts, such as user 'profiles A' and user 'B' both accessed the code, two copies are circulating at a current time and are tied to the original code source, all such actions are identified, annotated and saved with the original code log or as metatags linked to the code to document those instances with a timestamp and other information necessary to recall such events during an audit operation.

According to one example, one specific function may be to select a limited portion of the code which is properly accessed and authorized based on a user profile permission or other governing criteria. Further to the code access and application of permissions/restrictions associated with the user profile/user device, the code may have selective access applied to certain code blocks/segments based on the rights, status, and/or other credentials associated with the user profiles or user devices accessing the code. All subsequent code related actions are documented for later audit purposes.

Figure 2A:
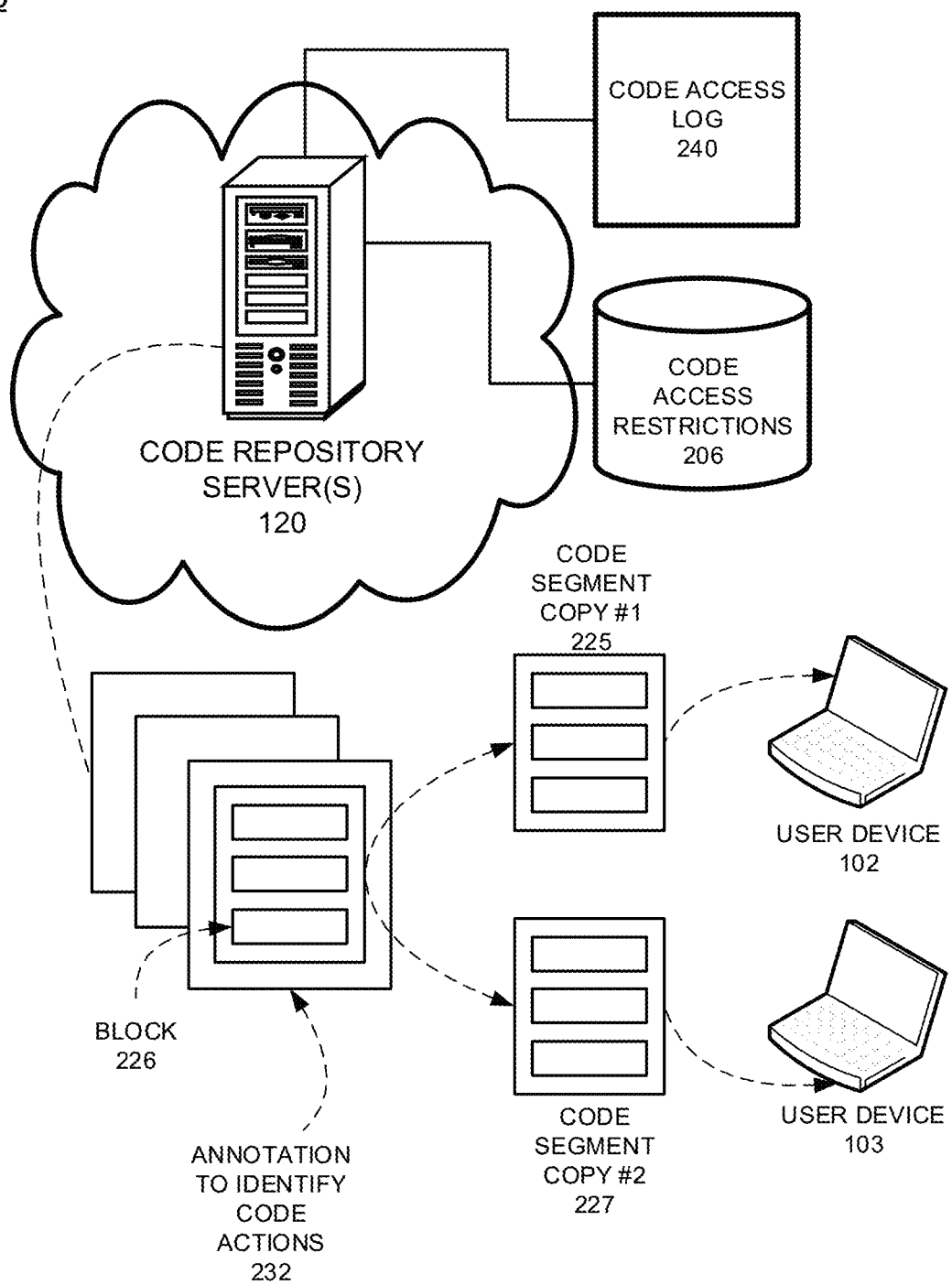
FIG. 2A illustrates an example code annotation and documentation management configuration according to example embodiments.

FIG. 2A illustrates an example code annotation and documentation management configuration according to example embodiments. Referring to FIG. 2A, the configuration 200 may include a code repository server 120 which may be a local enterprise server or a server maintained at a third party source, such as 'GITHUB' which can be used to access code and manage code development efforts. When one or more user devices 102/103 attempt to access the server 120 and retrieve, access and/or modify code, the code may be organized as segments or blocks 226 which may be accessed according to one or more code access permissions/restrictions 206 associated with the user devices 102/103. Each device profile may have a unique copy of the code blocks/segments 225/227 depending on the permissions and rights associated with the user devices 102/103. An annotation(s) 232 may be appended to the main version or code repository version to reflect which user device/profile accessed the code and made changes to the code. In another example, the code segment may be copied and supplied to the user devices as separate versions 225/227 of the same code.

Figure 2B:
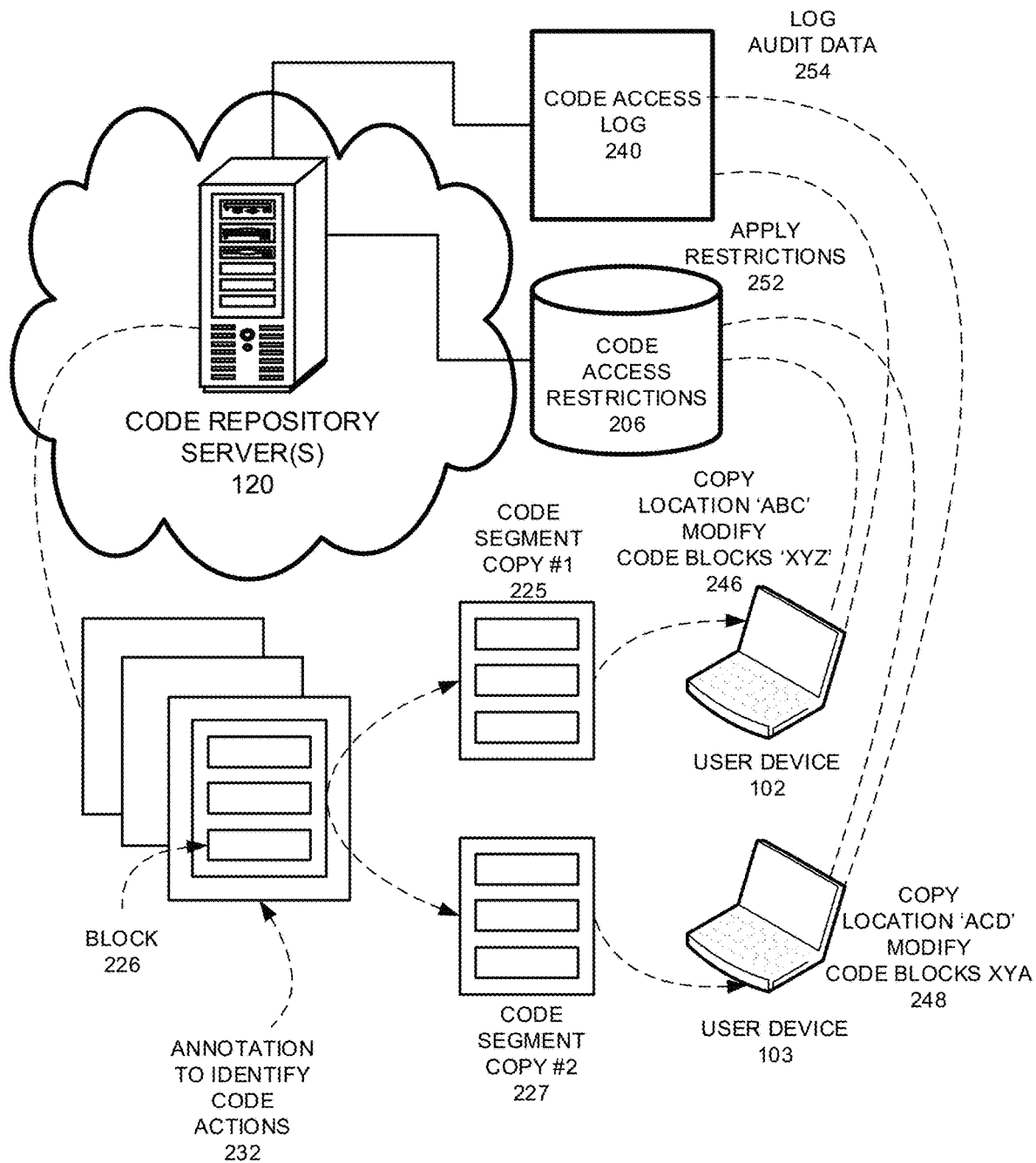
FIG. 2B illustrates another example code annotation and documentation management configuration according to example embodiments.

FIG. 2B illustrates another example code annotation and documentation management configuration according to example embodiments. Referring to FIG. 2B, in an active code access scenario, the configuration 250 may include each user device having one or more code segments accessible to their respective devices 102/103. The code may be subject to restrictions 206 which are applied 252 actively during code access and development sessions via an agent application operating on the user devices. Also, each copy of the code, code storage location, code modification, blocked access attempt, etc., which is performed is logged in code access log 240 as part of an active log or a periodic log audit function. In this example, the user devices 102/103 may be performing operations, such as modifying code via a particular storage location 'ABC' and via particular code blocks 'XYZ', user device 103 may perform a separate copy of particular location 'ACD' to modify code blocks 'XYA'. The efforts are unique and based on a common code. However, the copies of the code 225/227 are separate and unique but may be combined later into the main code source. The device operations 246/248 are logged in the log 240 as part of an audit 254 or each time the events occur.

In one example, an agent may be installed on a user device 102 to maintain constant communication with an agent application on the server. An identity of a user device may be confirmed from credentials, such as multi-factor authentication (MFA) which are stored on the device and forwarded during an access attempt. For example, a personal access token may be required to obtain access to the code repository. A software source code security function may be stored in the third party cloud code source. The agent application may be periodically auditing the user device 102 to ensure the permissions are active and the actions taken are consistent with the permissions associated with that particular user device 102. In another example, the user device access operation may invoke a library of software application versions be loaded onto the enterprise server to support the code management operations. For example, a code compiler may be loaded to support the user device testing and modifying the code so the code can be executed. One approach is to not permit changes to the developer code and test workflows by permitting user profiles for testing only such as 'compilers' for most common languages to selectively access code files.

Figure 2C:
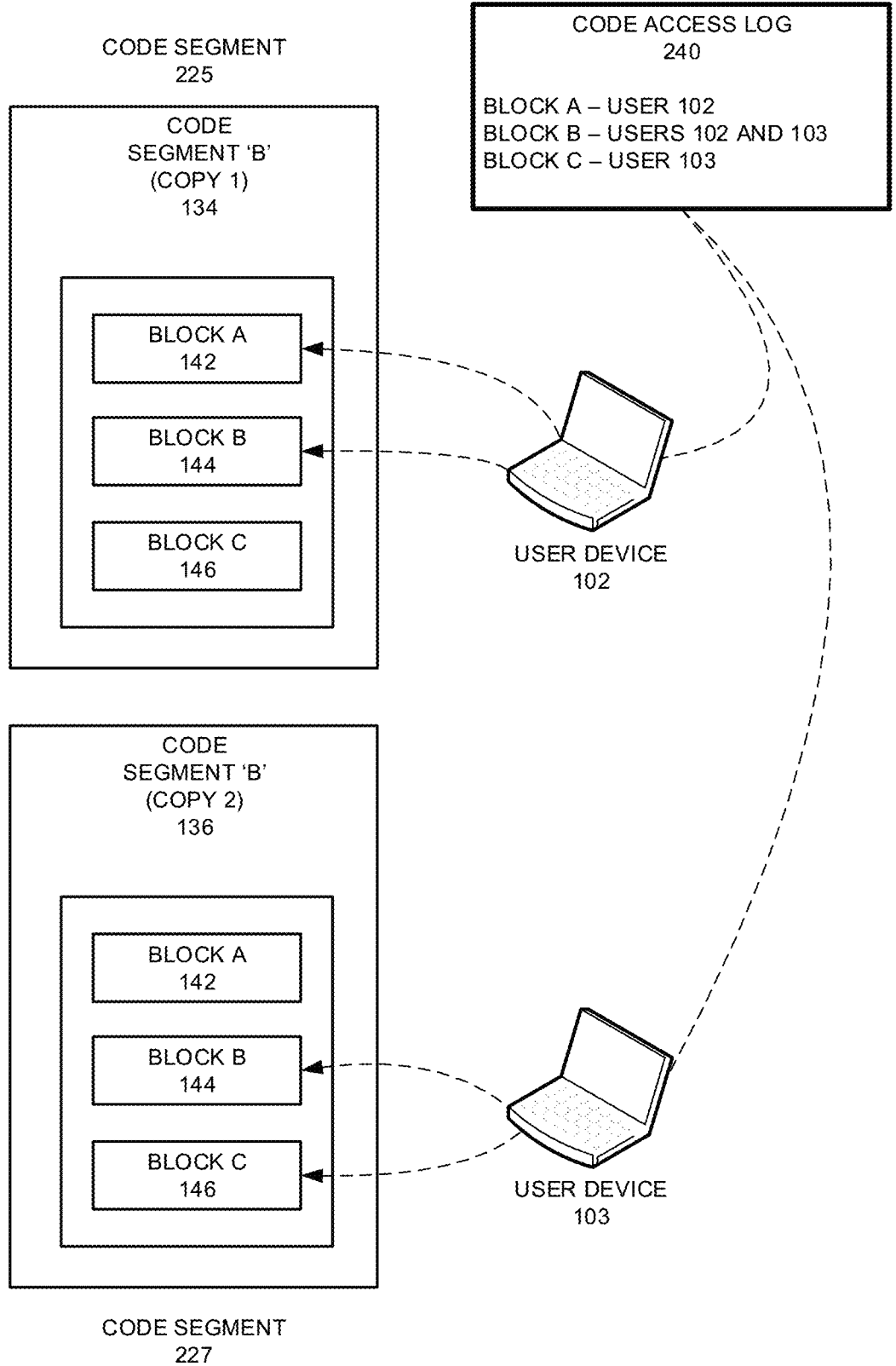
FIG. 2C illustrates an example code annotation and documentation management configuration for multiple code according to example embodiments.

FIG. 2C illustrates an example code annotation and documentation management configuration for multiple code according to example embodiments. Referring to FIG. 2C, in this configuration 270, two separate workstations or user devices 102/103 are both accessing code at the same time or in a manner overlapping one another. The code segment accessed may be the same code segment 'B', however, in this example, the separate copies 225 and 227 may include customized changes to the code identified from the copies 134 and 136 stored on the devices 102/103. In this example, the user device 102 is accessing block data, such as blocks 'A' 142 and 'B' 144 from its own copied code of segment 'B' but not 'C' 144. User device 103 is accessing blocks 'B' 144 and 'C' 146. Any modifications made may be combined into one version which is saved with the original source code. The changes to block 'B' which may differ from each device 102/103 may cause the changes/modifications to the code to be merged into a single copy which is stored in the code repository server 120. The changes may instead cause two versions to be stored until a final version can be authorized. The other approach may include authorizing changes for one block and only suspending changes to the block being modified by both devices. So in that case, the changes to 'A' 142 and 'C' 146 may be incorporated into the final code copy since there is not potential conflict between the two device versions since one device worked on one block and the other device worked on another block, while the changes to 'B' 144 are maintained in two separate copies until the changes can be authorized.

Figure 2D:
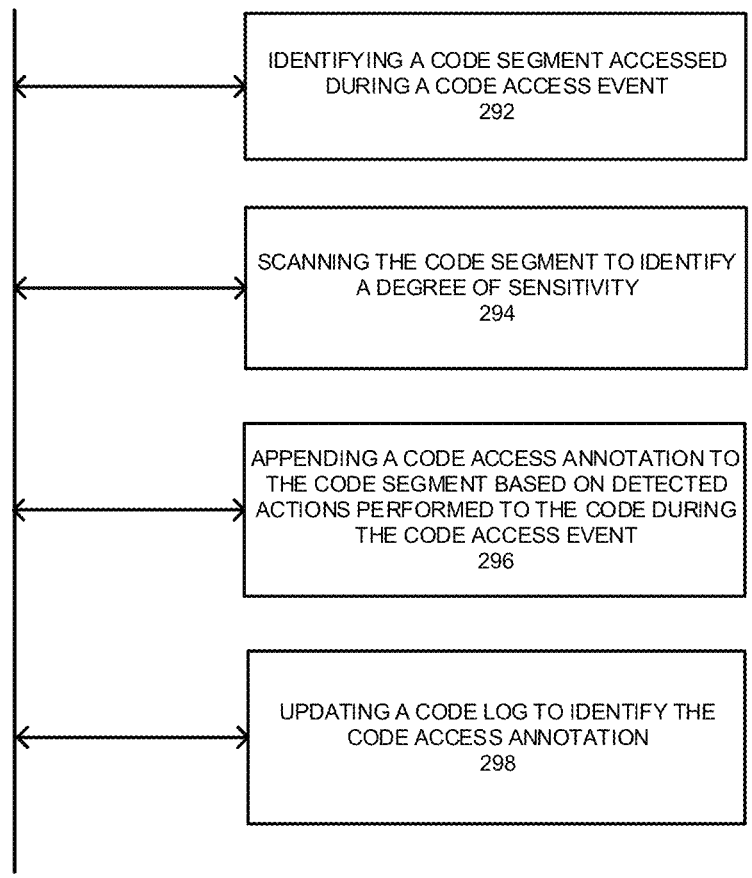
FIG. 2D illustrates an example flow diagram of an example process for documenting code access events according to example embodiments.

FIG. 2D illustrates an example flow diagram of an example process for documenting code access events according to example embodiments. Referring to FIG. 2D, the example process 290 may include identifying a code segment accessed during a code access event 292 by one or more user devices authorized to access the code. The process also includes scanning code of the code segment to identify a degree of sensitivity of the code 294, this may include determining whether the code includes certain variables, global parameters, etc., which are deemed sensitive. Another criteria may include identifying whether the file associated with the code is marked sensitive by referencing a list of sensitive files. The process may also include appending a code access annotation to the code segment based on detected actions performed to the code during the code access event. This may include a timestamp, user profile name, user device identifier, etc. The information may be appended to the code responsive to the access operation and/or added to a master log 240 of access operations detected. The process may also include updating the code log to identify the code access annotation 298.

The process may also include identifying a file type associated with the code segment, and applying selective access to the code segment based on the identified file type. The applying of the selective access may be performed to the code segment based on the identified degree of sensitivity of the code. If the code is sensitive then the selective access may be invoked to limit portions of the code which include the sensitive criteria. When the code is determined to be sensitive then the code access events may be required to be monitored and stored in the event log. The process may also include periodically monitoring the code access event to identify actions performed to the code segment during the code access event, and storing a record of each of the actions performed to the code segment in the event log. During code access, one or more code access restrictions may be applied to the code segment, and the one or more code access restrictions can include one or more of a code modification restriction, a code read restriction, and a code copy restriction. The code access event may include one or more of a code displaying event, a code copy event and a code modification event.

Example embodiments provide ways to enforce software code protections and modifications to protect code from unauthorized sources and to track the use of the code on developer workstations. Code 'provenance' and application of permissions/restrictions to the code may include the code being accessed, annotated, tracked, modified, etc., according to the code's history throughout the cloud and/or the enterprise computing environments and the user profiles/devices associated with the code events.

In general, identifying code access events may be performed by tracking access event data stored in a log or metadata of a file during a provenance audit effort. This audit information can be retrieved and used to confirm code changes, locations, user profiles, and may also include details about the origin and current status of the code. When the code is accessed, saved, audited, etc., the 'provenance' of the code must be identified and confirmed to ensure the origin and last known location are accurate prior to authorizing any further code access events and during a full code scan and deep inspection, such as a 'blueprint' (all identified changes) analysis of all known code events and whether such events are authorized or outside the scope of the management criteria.

Figure 3A:
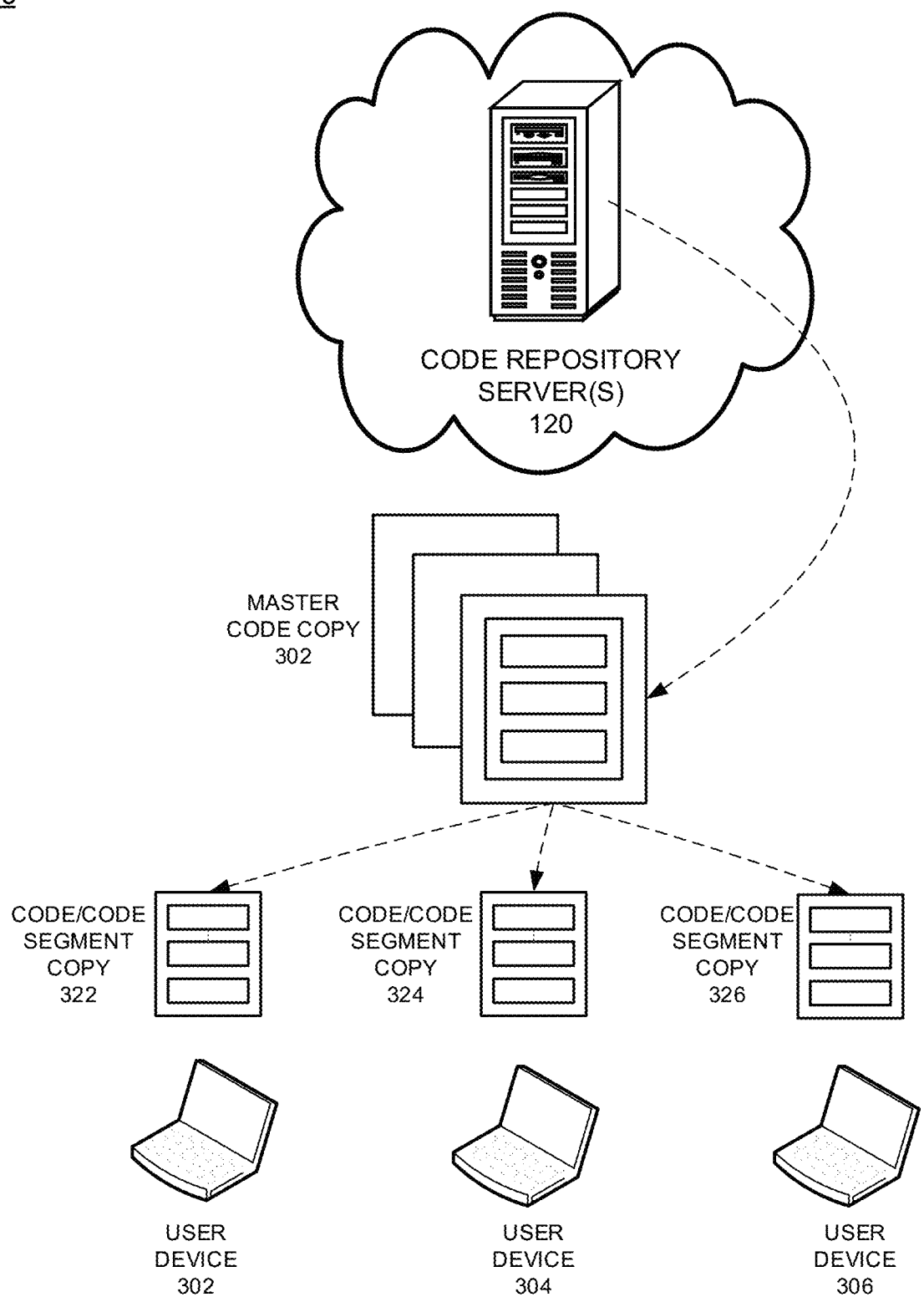
FIG. 3A illustrates an example network diagram of multiple code access instances and established provenance of the code modification events according to example embodiments.

FIG. 3A illustrates an example network diagram of multiple code access instances and established provenance of the code modification events according to example embodiments. Referring to FIG. 3A, the configuration 300 illustrates a code server source, such as a code repository 120 that provides access to developer workstations 302-306, which may be operating within an enterprise environment and which may seek access to code for development purposes. When a code access event is performed, the event is logged and identified in a master log stored and maintained in the server. Also, the code itself may be annotated with appended information, such as metadata, tags and/or labels which properly identify the code access event(s) times, locations and types of modifications.

During the access events, copies 322, 324 and 326 of the code 302, such as portions of the code (code segments), which are authorized for code modification purposes, may be retrieved and stored on the user devices 302-306. Those copied and/or accessed versions of the code 322-326, which are utilized by the respective user devices 302-306 may be identifiable via an audit tracing procedure that tracks all user devices managed by a central server 120. In one example, certain lines of code may be copied and used as the basis when scanning the user devices during an audit so the code audit application operating on the server 120 can determine whether certain strings of code are included on those devices and whether the code that was copied is permitted to be used by those devices. The scanning audit procedures may occur periodically (e.g., after a period of time) or in response to a trigger operation, such as when a device accesses the code or an authorization of access is performed.

Figure 3B:
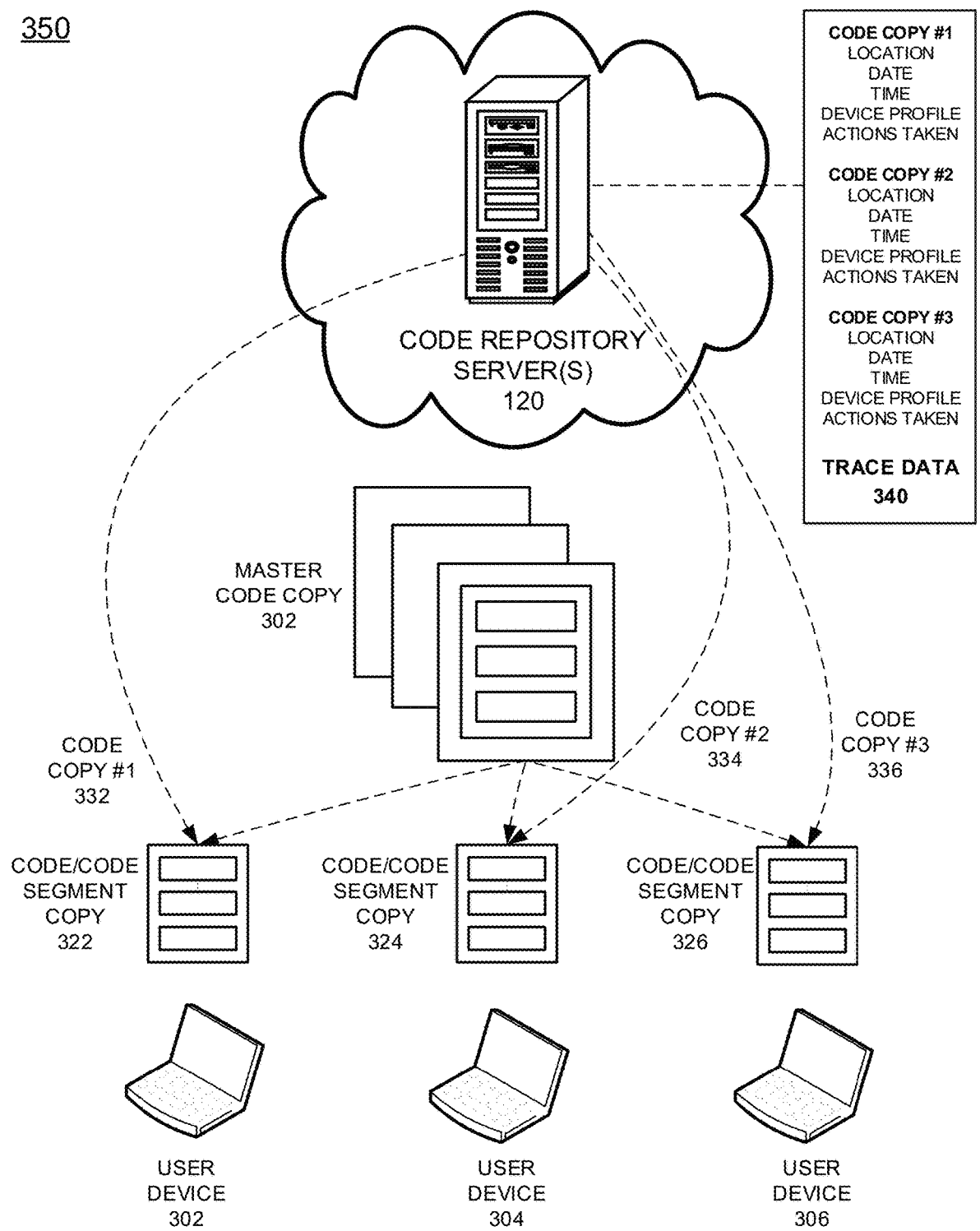
FIG. 3B illustrates an example network diagram of multiple code access instances and established provenance of the code modification events with code trace data according to example embodiments.

FIG. 3B illustrates an example network diagram of multiple code access instances and established provenance of the code modification events with code trace data according to example embodiments. Referring to FIG. 3B, the example configuration 350 illustrates an example where the copied code segments 332-336 may be portions of the master code 302, which were accessed and/or copied to the user devices. The resulting trace data 340 may be a log of code data access and modification events which are collected periodically to create a record of those events based on trace records from audits over time. The auditing may be a periodic event that occurs to identify whether code access and modification events are taking place by any device that can be tracked and monitored. Information retrieved during a trace event may include, date, time, device storage location, device profile, user profile, network address, portions of the code which are copied/accessed.

According to one example, a first device 302 may access and copy code segment 322 and a corresponding version of the code 332 will be created and stored in the code repository for a temporary period of time and/or on the device 302. The code will be accessible and modifiable during the defined period of time and as long as the access is active by the device 302. When the inactivity is detected for a certain period of time, the code will be saved and stored and access will be removed and will require additional authorization. Any changes, such as copying, new data added, new data removed, etc., will be logged in the trace data log 340 along with the time, date, the user profile, the user device information, network information etc., Either concurrently or subsequently, additional code access operations will be implemented by more devices 304/306 and the process repeats by copying the code 334/336, creating another code access and development session and when completed the trace data log 340 is updated to reflect an additional access and code development process.

One example includes identifying code access events which are performed by tracking access event data stored in a log or metadata of a file during a provenance audit effort. This audit information can be retrieved and used to confirm code changes, code access and/or storage device locations, user profiles, and may also include details about the origin and current status of the code. When the code is accessed, saved, audited, etc., the provenance record must be identified and confirmed to ensure the origin and last known location are accurate prior to authorizing any further code access events and during a brute force inspection, such as a periodic trace analysis of all registered devices.

Another example embodiment may include tracking code by a chain of custody, such as by logging access events, such as the profiles which accessed, copied, changed, moved, and/or canceled code. Once code is created, certain 'fingerprint' characteristics may be created to coincide with the code, such as metadata associated with the code attributes, such as date of creation, certain variables, code length, dates of changes, user profiles accessed code, storage locations of code, size of data, etc. Other attributes include file names and portions of code, such as strings which are known to be proprietary to the code development.

In one example of tracking code and code events, a code copy may be known to exist in a code repository based on a data file directory and or data files containing the code at a particular storage location. The code attributes which define the code's presence, contents and/or storage location may be identified and used as the basis for a brute force code tracking session, which may search known code repositories, such as online sites/links which are known for sharing code and other software development tools. Other locations may include queries be sent to search engines to obtain results based on the code attributes. File names are one attribute, strings of code language are another attribute, each of which may be used to search for the code in unauthorized locations. Scanning code in public repositories may yield positive or negative results as it pertains to the code being examined for duplicates and unauthorized copies.

In one example, if a file name or other code attribute is identified in a public repository, the code may be deemed stolen or breached. If the code is discovered by a file name or other attribute, the code can then be copied and compared to the known versions of the code to ensure there are enough matching attributes to yield an unauthorized copy. If so, the user profiles linked to the code access operations in the enterprise location may be identified to identify the profiles associated with accessing that code prior to the unauthorized code discovery event. In such an event, a token block may be requested to deny tokens which may have been previously available to user profiles to access the code. A token rotation may be initiated automatically responsive to the code breach identification. This prevents previously authorized parties with token access from further access when the token is revoked or rotated.

Figure 3C:
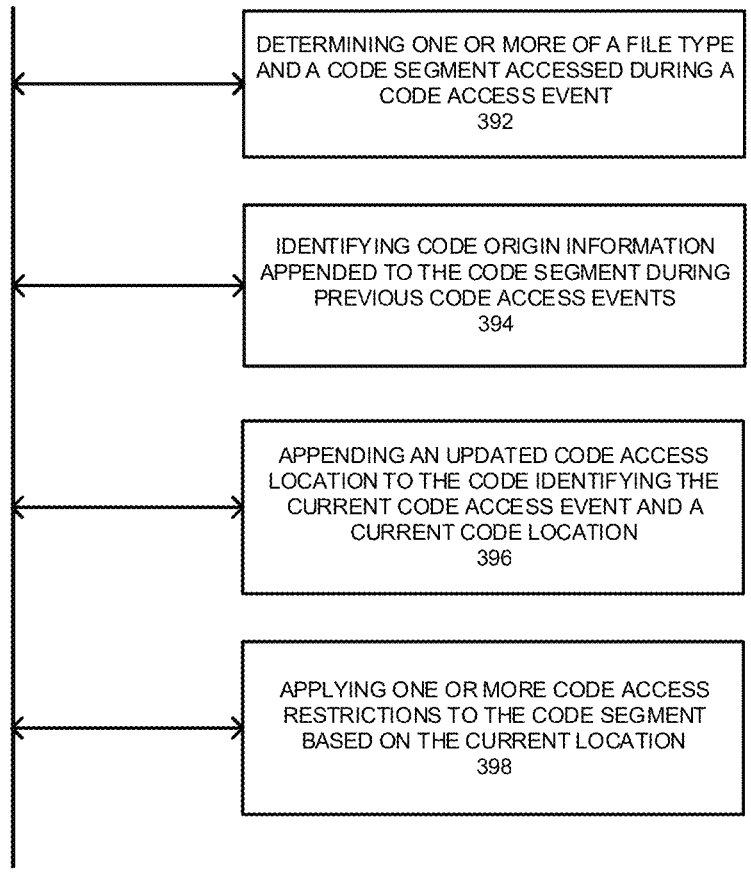
FIG. 3C illustrates an example flow diagram of a process for establishing provenance of the code modification events according to example embodiments.

FIG. 3C illustrates an example flow diagram of a process for establishing provenance of the code modification events according to example embodiments. Referring to FIG. 3C, the process 290 may include determining one or more of a file type and a code segment accessed during a code access event 292, which may include identifying a label or identifier that identifies the code that was accessed. The process also includes identifying code origin information appended to the code segment during previous code access events 294. For example, the code may have a trace log with various instances of access and location information stored in memory based on previous user device access and code development instances. The process also includes appending an updated code access location to the code segment identifying the current code access event and a current code location 296 to identify the current access attempt and code development status. The process also includes applying one or more code access restrictions to the code segment based on the current code location 298. The criteria to allow, disallow, limit the amount of access time, permit/not permit code modifications and copying may be based on access location, user profiles and other criteria.

The current code location may be based on one or more of a user profile, a corresponding device profile, and a network address. The information is used to identify a location as acceptable or unacceptable in which case the code will be locked and unobtainable. The process also includes identifying a previous code location from the metadata associated with the code and updating code storage repository information based on the current code location, and determining whether the current code location is associated with code access privileges which match the previous code location. The code access and development privileges may vary depending on the current location data stored in the code log metadata. When a known location is identified, the privileges may include more options than when the code is in a new location or an unknown location. In this example, the process may include applying one or more rules to the current code location based on rules associated with the previous code location assuming that the new location is identified as an acceptable location. The process also includes performing a string comparison of the code segment to one or more other code segments, and the one or more other code segments are additional copies of the code segment. In this example, portions of the code are taken as a match criteria and used to scan various machines across the Internet, at known development sites and on known enterprise user devices to identify whether the code is available outside the code repository. This auditing process may be a test to identify if versions of the code are available in unauthorized locations. The process also includes detecting a plurality of code segment copies which correspond to a plurality of code segment access events associated with the code segment, hashing the code segments, and storing the hash key in a file associated with the code segment. This provides a way to prevent unauthorized parties from accessing the code. The hashing of the code segment may provide storing the hash in a local database and creating an index for efficient search efforts and reference purposes.

According to one example, one specific function may be to select a limited portion of the code which 'checks-out' ok based on a user profile permission or other governing criteria. Further to the code access and application of permissions/restrictions, the code may have selective access applied to certain code blocks/segments based on the rights, status, and/or other credentials associated with the user profiles or user devices accessing the code.

In one example, an agent may be installed on a user device 102 to maintain constant communication with an agent application on the server. An identity of a user device may be confirmed from credentials which are stored on the device and forwarded during an access attempt. For example, a personal access token may be required to obtain access to the code repository. A software source code security function may be stored in the third party cloud code source. The agent application may be periodically auditing the user device 102 to ensure the permissions are active and the actions taken are consistent with the permissions associated with that particular user device 102.

Example embodiments provide ways to enforce software code protections from use and modification to the code from unauthorized sources, and to track the use of the code on developer workstations. Further to code provenance and application of permissions/restrictions to the code, the code may be accessed and then annotated, tracked, modified, according to the code's history of use throughout the cloud and/or the enterprise environment and the user profiles/ devices associated with the code events. Also, the code may be periodically traced/audited to identify all such events which have occurred over a period of time which include accessing, modifying, egress code operations (e.g., moving code, copying code, etc.), testing, authorization to access the code, etc. The code may be stored in one known location, such as a master server 120, however, portions of the code may be used as the basis for determining whether other versions/copies of the code are available and whether the use was authorized or unauthorized.

Figure 4A:
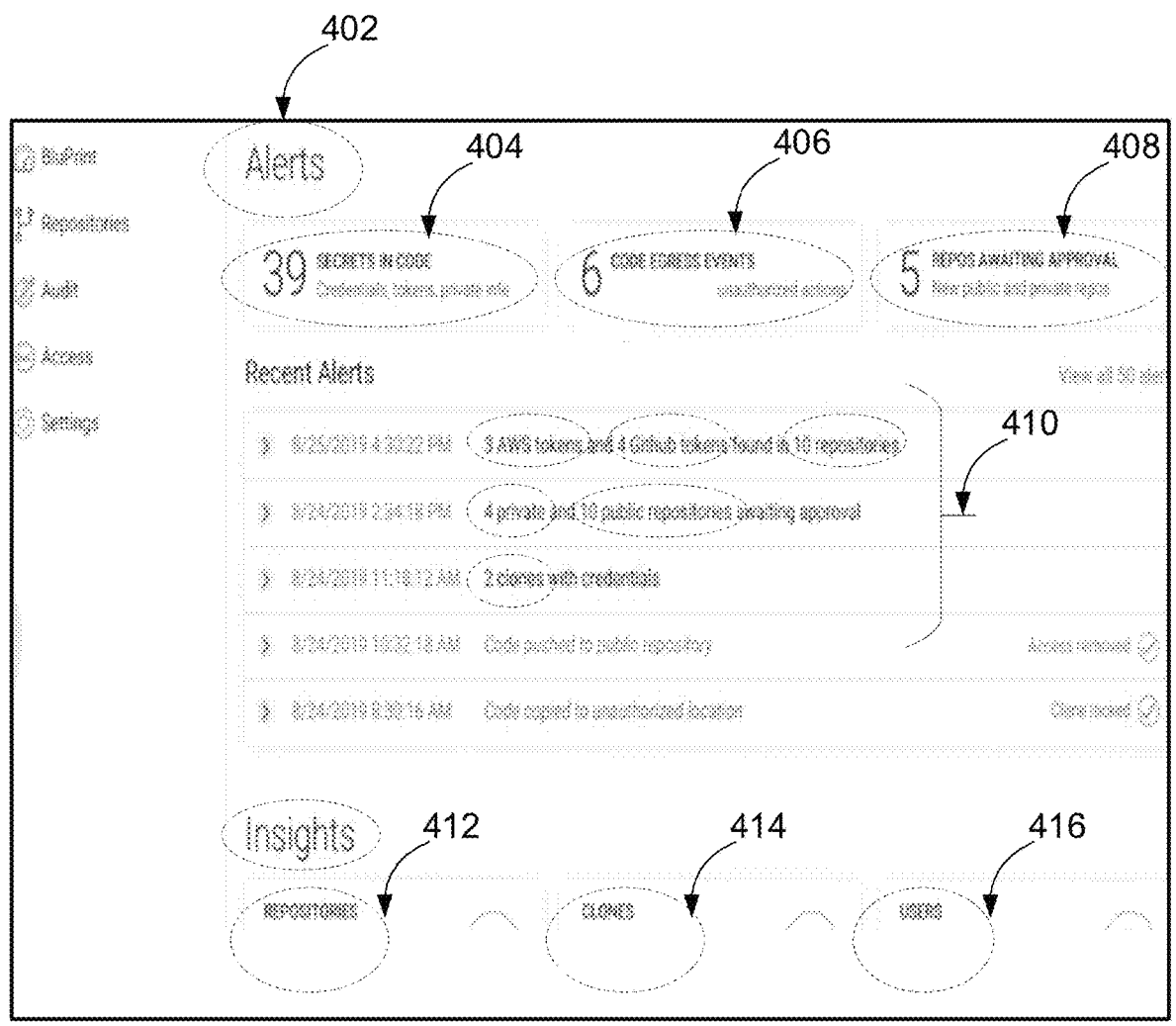
FIG. 4A illustrates an example user interface of a code audit process for detecting code instances on a network according to example embodiments.

FIG. 4A illustrates an example user interface of a code audit process for detecting code instances on a network according to example embodiments. Referring to FIG. 4A, the example 400 illustrates a user interface with a summary of reporting operations, which demonstrates the results of a scan/search/audit operation(s) that attempted to identify all instances and related information of use, modification and storage of the code.

The code auditing/reporting results 400 may be realized by a server or devices which are configured to track instances of metadata or control data, such as: times, dates, locations, user profiles, egress operations, copying operations, modifying operations, deleting operations, etc., associated with the code. For example, generated alerts 402 may include secrets identified 404, such as tokens used, private data, egress actions 406, such as policy violations, unauthorized actions, new public and private repositories 408 identified as storing the code, etc. The number of occurrences 410 may be used to establish an acceptability/unacceptability threshold for action. For example, if the number of egress events for a period of time exceeds a threshold (T), such as five instances, then the code may be locked from further access to all parties except for certain high level administrators. For example, if a copy of sensitive code is identified in five or more new locations within a defined period of time (Tt) then an automated action may occur which prevents certain access and other functions until the matter is resolved by reducing the number of locations storing the code identified during a next audit process. Another operation may be a repository identification process where the repositories storing the code are identified and are required to be approved to alleviate or remove an unauthorized action. The insights identified may include a summary of repositories identified 412, clones of the code 414 and users, such as user profiles linked to the code instances 416.

One example of a period of time (Tt) may include 48 hours, one week, etc., that the code is tracked and the results are compiled and compared to acceptability thresholds to determine if certain users are required to have their access privileges revoked. If a code use violation is identified based on unacceptable storage locations or other criteria (e.g., time thresholds instances), then user rights of those with low-level rights or those who accessed the code in those instances may lose their access privileges. Another criteria may be counting the number of duplications, such as clones created and where the clones are stored. A certain number of clones may be considered acceptable while any number over that amount may be deemed unacceptable.

The various versions of the code may be identifiable via an audit tracing procedure that tracks all user devices, repositories, etc., identified by a central server application over a defined period of time. For example, lines of code may be copied and used as the basis to scan various user devices during an audit so the code tracking application can determine whether certain strings of code are included on those devices and whether the code that was copied is permitted to be used by those devices. Other criteria for code tracing includes file names and execution paths of the code, which are traced for existence within the network being monitored.

Figure 4B:
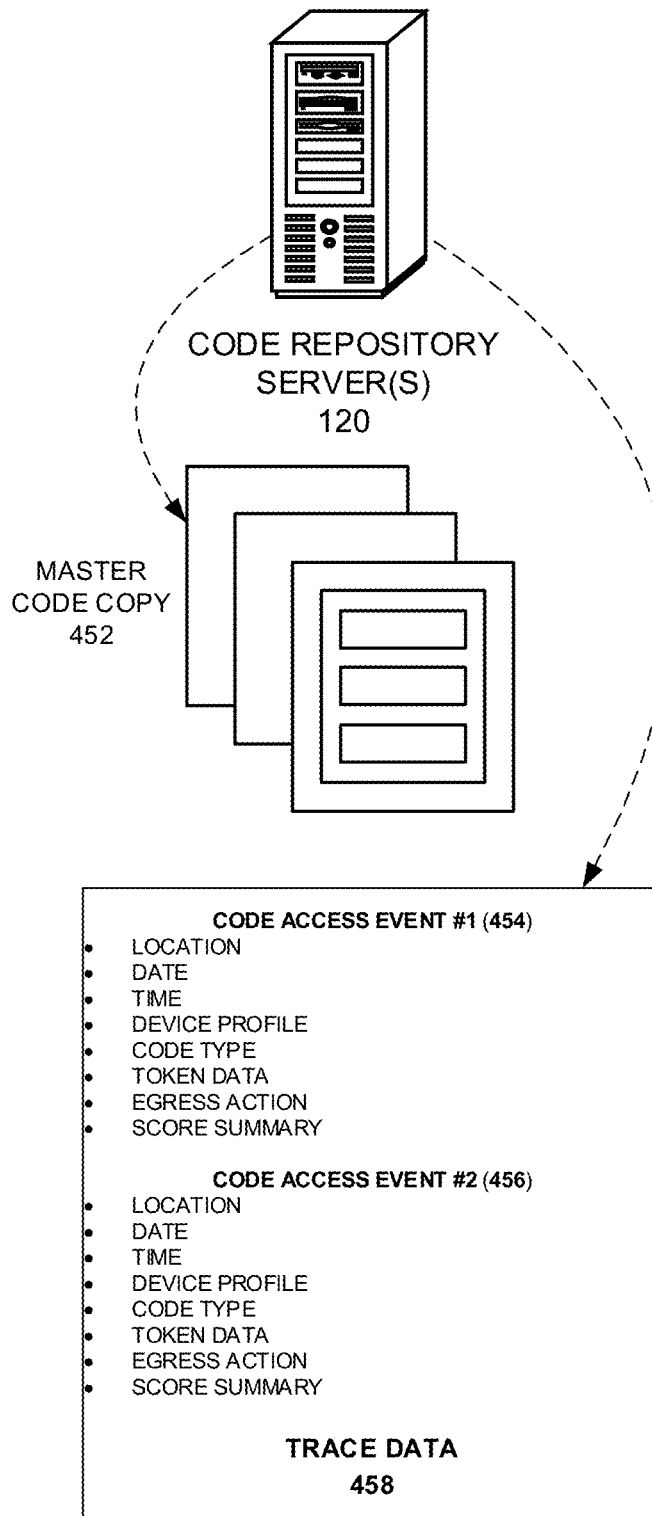
FIG. 4B illustrates a network device which performs example code detection for code use and related code events according to example embodiments.

FIG. 4B illustrates a network device which performs example code detection for code use and related code events according to example embodiments. Referring to FIG. 4B, the configuration 450 includes the server 120 responsible for storing and managing a master code copy 452. Each instance of the code being accessed, copied, modified, executed, etc., is tracked and stored in the log of trace data 458. For example, the code location, date, time, device information, code type, token data, egress actions, and/or score summary, etc., may all be part of the information stored with reference to a code event 454/456.

Figure 4C:
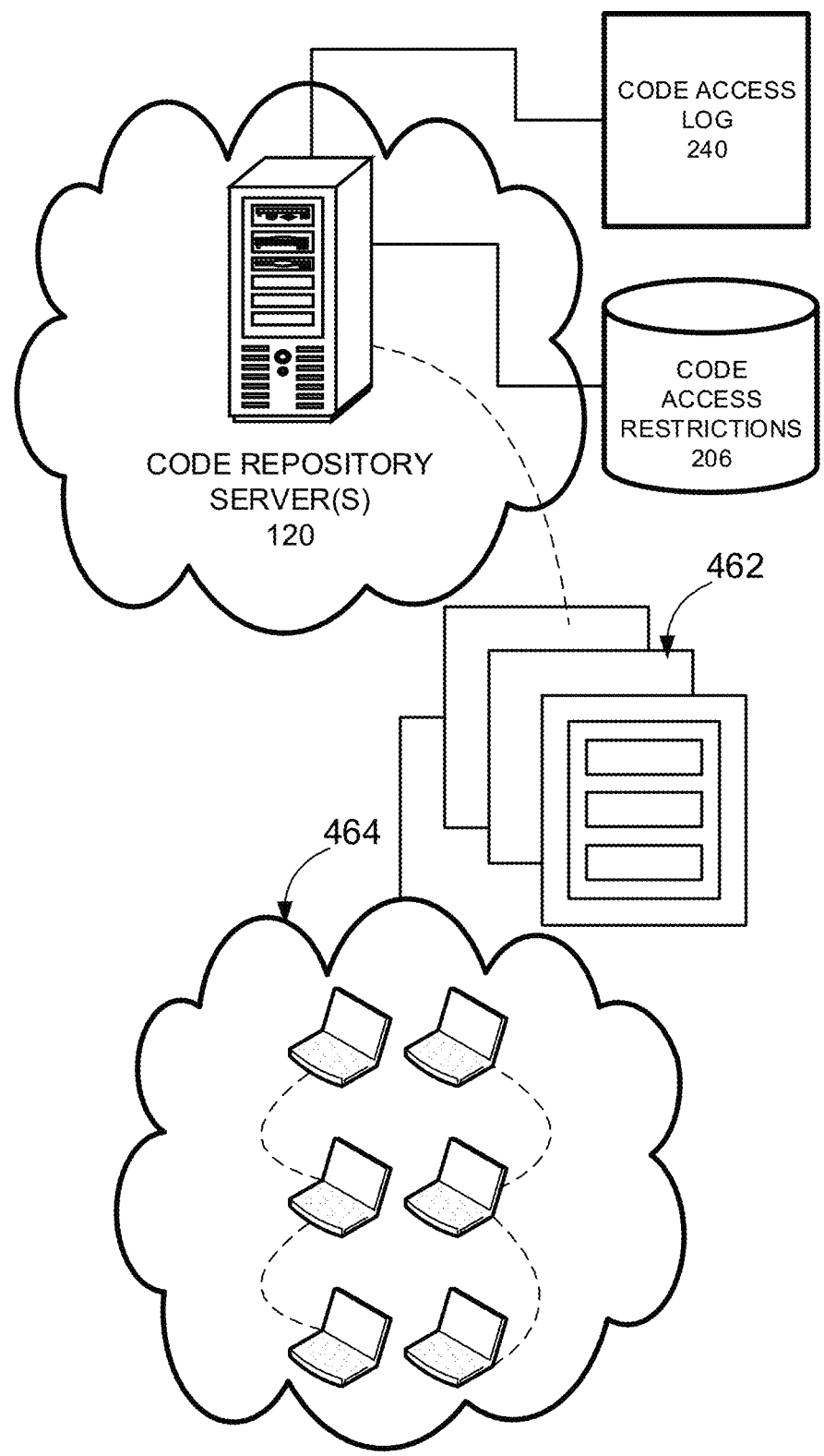
FIG. 4C illustrates an example configuration for detecting code instances on a network according to example embodiments.

FIG. 4C illustrates an example configuration for detecting code instances on a network according to example embodiments. Referring to FIG. 4C, the code repository server 120 may attempt to perform a trace audit that is based on a core code 462, which represents one or more code builds which are maintained as master copies. The master copies 462 are used as the basis for software code audits performed on a network 464, such as the Internet, a private Intranet, an enterprise entity, etc. In general, the code tracing audits should be performed on targeted locations where the code is likely to be stored, for example, the software development sites used by many are excellent sources to identify code use and unauthorized code usage. When the code or copies of the code are identified as being in one or more unauthorized locations, then the code may be locked from access at the code repository source 120 until the unauthorized locations have been secured or the code is removed. Any of the devices in the network 464 which are authorized to access the code may be omitted from the unauthorized code use list data. A total number of code existence, use, etc., violations may be applied to a weighted function which weights each unauthorized code instance (location, execution, modification, etc.) to create a sum for a total amount of unauthorized instances. The score may be a basis for temporarily preventing code access and other code restrictions (e.g., execution, storage, etc.).

The trace data 458 may be a tally report of data for all instances of the code identified over a period of time. For example, code records 454/456 may include a location, date, time, device profile, code type, token data, egress actions, etc., and scores which are summarized based on the results of code monitoring operations. Each violation or unexpected occurrence may cause the score to increase causing an automated action to occur. The trace/monitor data 458 may be a log of code data access events which are collected periodically to create a record of those events based on trace records from audit operations. The auditing may be a periodic event that occurs to identify whether code access events are taking place by any device that can be tracked and monitored. Information retrieved during a trace event may include, date, time, device storage location, device profile, user profile, portions of the code which are copied/accessed.

One example includes identifying code access events which are performed by tracking access event data stored in a log or metadata of a file during a provenance audit effort. This audit information can be retrieved and used to confirm code changes, locations, user profiles, and may also include details about the origin and current status of the code. When the code is accessed, saved, audited, etc., the 'provenance' or record must be identified and confirmed to ensure the origin and last known location are accurate prior to authorizing any further code access events and during a brute force inspection, such as a periodic trace analysis of all registered devices. All such data is stored in the audit trace list 458.

Another example embodiment may include tracking code by a chain of custody, such as by logging access events, such as the profiles which accessed, copied, changed, moved, and/or canceled code. Once code is created, certain 'fingerprint' characteristics may be created to coincide with the code, such as metadata associated with the code attributes, such as date of creation, certain variables, code length, dates of changes, user profiles accessed code, storage locations of code, size of data, etc. Other attributes include file names and portions of code, such as strings of code which are known to be proprietary to the code development.

In one example of tracking code and code events, the code copy may be known to exist in a code repository based on a data file directory and or data files containing the code in a particular storage location. The code attributes which define the code's presence, contents and/or storage location may be identified and used as the basis for a brute force code tracking session, which may search known code repositories, such as online sites/links which are known for sharing code and other software development tools. Other locations may be identified by queries being sent to search engines to obtain results based on the code attributes and network entities associated with the queries. File names are one attribute, strings of code language are another attribute, each of which may be used to search for the code in unauthorized locations. Scanning code in public repositories may yield positive or negative results as it pertains to the code being examined for duplicates and unauthorized copies.

In one example, if a file name or other code attribute is identified in a public repository, the code may be deemed stolen or breached. If the code is discovered by a file name or other attribute, the code can then be copied and compared to the known versions of the code to ensure there are enough matching attributes to yield an unauthorized copy. If so, the user profiles linked to the code access operations in the enterprise location may be identified to identify the profiles associated with accessing that code prior to the unauthorized code discovery event. In such an event, a token block may be requested to deny tokens which may have been previously available to user profiles to access the code. A token rotation may be initiated automatically responsive to the code breach identification. This prevents previously authorized parties with token access from further access when the token is revoked or rotated.

Figure 4D:
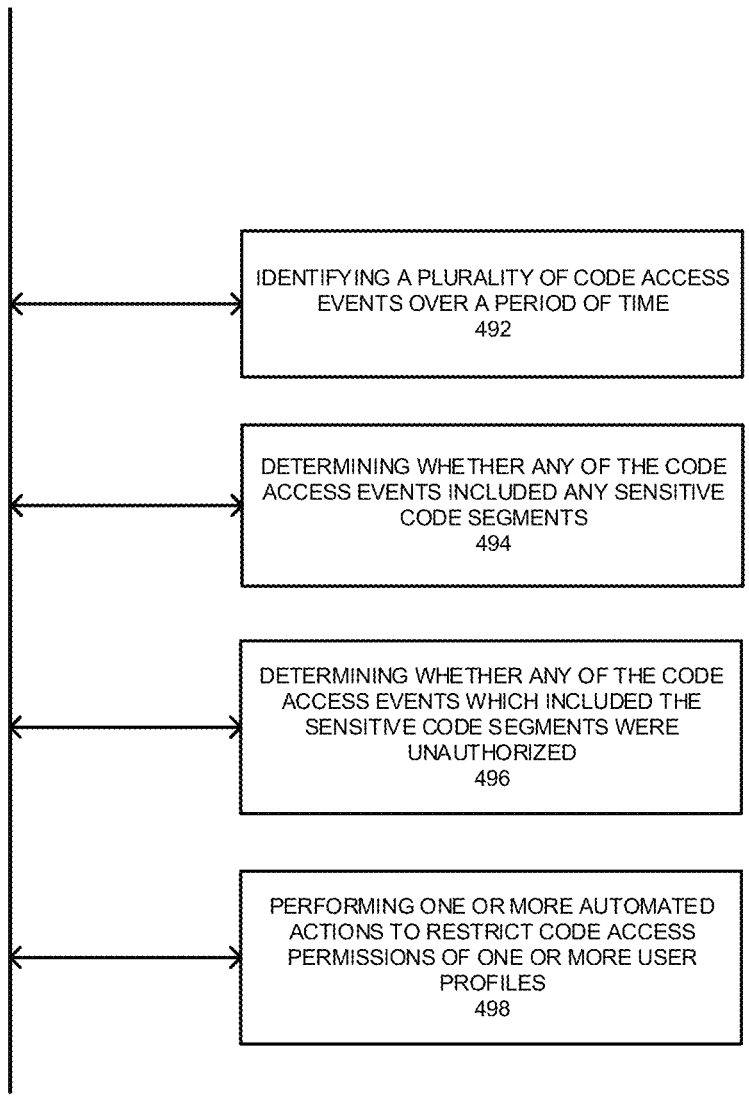
FIG. 4D illustrates an example flow diagram of a process for managing code instances on a network according to example embodiments.

FIG. 4D illustrates an example flow diagram of a process for managing code instances on a network according to example embodiments. Referring to FIG. 4D, the example process 490 includes identifying a plurality of code access events over a period of time 492, and determining whether any of the code access events included any sensitive code segments 494, and this may include any screened portions of the code which are traced to identify access, execution, modification and/or egress of the code for any reason. The actions taken will cause the code to be identified. The process may also include determining whether any of the code access events which included the sensitive code segments were unauthorized 496, and performing one or more automated actions to restrict code access permissions of one or more user profiles.

The one or more automated actions may include one or more of revoking user profile code access permissions, locking access to the sensitive code segments, and preventing code egress operations, and the code egress operations may include one or more of moving the code, copying the code and storing the code in a new data storage location. When calculating the risk or relative amount of code instances, summing the weights assigned to the unauthorized code access events will provide a benchmark that can be used to compare to a threshold. By creating a score based on the summed weights and determining whether the score exceeds a threshold a decision can be made to increase or decrease or leave alone the restrictions on the code. When the score exceeds the threshold, a code access violation notification may be created and logged or used to notify the interested parties.

The process may also include initiating a code audit operation which identifies the code access events over a period of time based on code events stored in a code log, determining whether a number of code clone events exceeded a clone event threshold, and creating an alert when the clone event threshold is exceeded and locking access to the sensitive code segments. A code clone may be an exact copy of a code, or a copy that is substantially similar enough to be considered a clone when identifying additional copies of code. Also, determining whether the one or more unauthorized code access events were based on unauthorized code storage locations, unauthorized user profiles, and access attempts which did not use authorized tokens may provide a basis for code enforcement of unauthorized actions. Also, a machine learning procedure may be applied to track a chain of custody of the code.

The one or more automated actions may include one or more of revoking user profile code access permissions, locking access to the sensitive code segments, and preventing code egress operations, and the code egress operations include one or more of moving the code, copying the code and storing the code in a new data storage location. The method may include summing weights associated with the unauthorized code access events, creating a score based on the summed weights, determining whether the score exceeds a score threshold. When the score exceeds the score threshold, a code access violation notification may be created. The method may also include initiating a code audit operation which identifies the code access events over the period of time based on code events stored in a code log, determining whether a number of code clone events exceeded a clone event threshold, and creating an alert when the threshold is exceeded and locking access to the sensitive code segments. The method may also include determining whether the one or more unauthorized code access events were based on unauthorized code storage locations, unauthorized user profiles, and access attempts which did not use authorized tokens. The method may further include applying a machine learning procedure to track a chain of custody of the code.

In one example, an agent may be installed on a user device to maintain constant communication with an agent application on the server. An identity of a user device may be confirmed from credentials which are stored on the device and forwarded during an access attempt. For example, a personal access token may be required to obtain access to the code repository. A software source code security function may be stored in the third-party cloud code source. The agent application may be periodically auditing the user device to ensure the permissions are active and the actions taken are consistent with the permissions associated with that particular user device. In another example, the user device access operation may invoke a library of software application versions be loaded onto the enterprise server to support the code management operations. For example, a code compiler may be loaded to support the user device testing and modifying the code so the code can be executed.

Example embodiments provide ways to enforce software code protections and modifications to protect code from unauthorized sources and to track the use of the code on developer workstations. Further to code provenance efforts and the application of permissions/restrictions to the code, developers may access the code and annotate, track, modify, the code. The code events applied to the code may create history data that is identified as the code is referenced throughout the cloud and/or the enterprise environment, and based on the user profiles/devices associated with the code events. Also, the code may be periodically traced to identify all such events which have occurred over a period of time which include accessing, modifying, egress code operations (e.g., moving code, copying code, etc.), testing, authorization granted to access the code, etc.

Figure 5A:
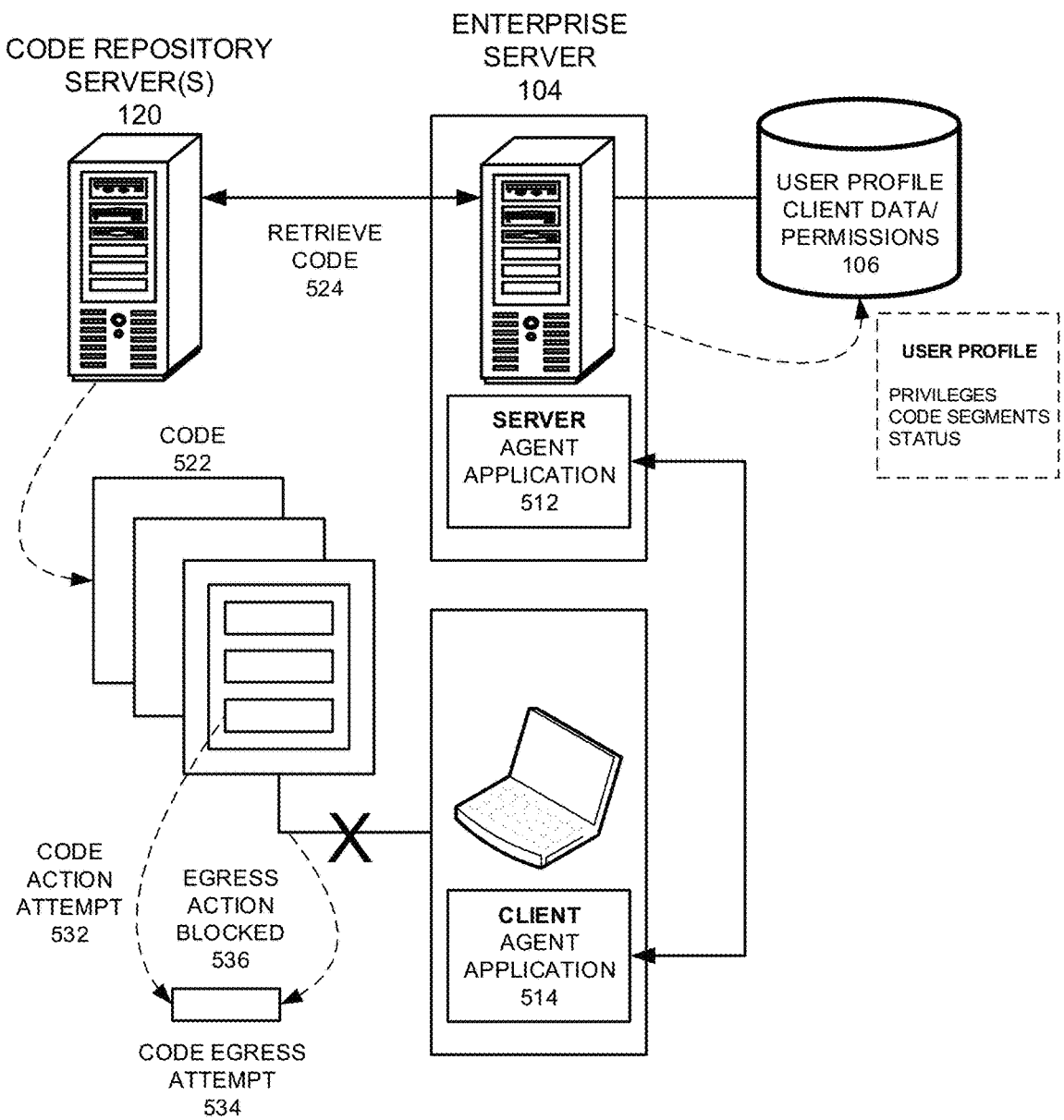
FIG. 5A illustrates an example network configuration for detecting code egress according to example embodiments.

FIG. 5A illustrates an example egress code monitoring and reporting configuration according to example embodiments. Referring to FIG. 5A, the configuration 500 includes an enterprise server 104 as an entity used to manage the access and/or storage of the code. When a use profile attempts to access code, the user profile of the client device may be retrieved from the data storage 106. The agent application 514 may communicate to a server agent application 512, which monitors the client actions and reports the actions to an authority. Also, any violations to the rights of the client device may cause the privileges to be automatically revoked.

The enterprise server 104 may store the code in a code repository server 120. When a code retrieval action 524 is received, the code 522 may be identified as a particular segment, group, file or set of files which are identified as having a particular designation, such as a restriction or open access policy. Once the client profile is identified as having access to the code, the code action (copy, modify, delete, execute, etc.) attempt 532 may be identified and the corresponding portions of code may be selected (code segment/block) and the entire procedure may be logged to capture the code event history. In the event that the client device is attempting any type of egress action, such as to move, copy or duplicate the code, the 'egress' attempt is identified 534 and the action may be blocked 536. For example, when a client device attempts to copy the code from a server, such as by a client device and profile that has write and edit permissions, but not necessarily permission to remove the code, one approach is to detect, reference the permissions of the user profile and then block the egress action.

Metadata can be monitored in association with the code and/or a corresponding data file, and an attempted copy action of a file may be detected and blocked as a data loss prevention operation. Another approach may be to block the port used by the server/client device to communicate and thus this will thwart an attempted code egress action. The port may be a client device port, a network device port, a server port, etc. Also, the code does not have to be a file and instead could be a portion of code inside a file that includes various code portions. Also, a token may be used as an authentication factor, such as username and password, a device profile, etc.

Figure 5B:
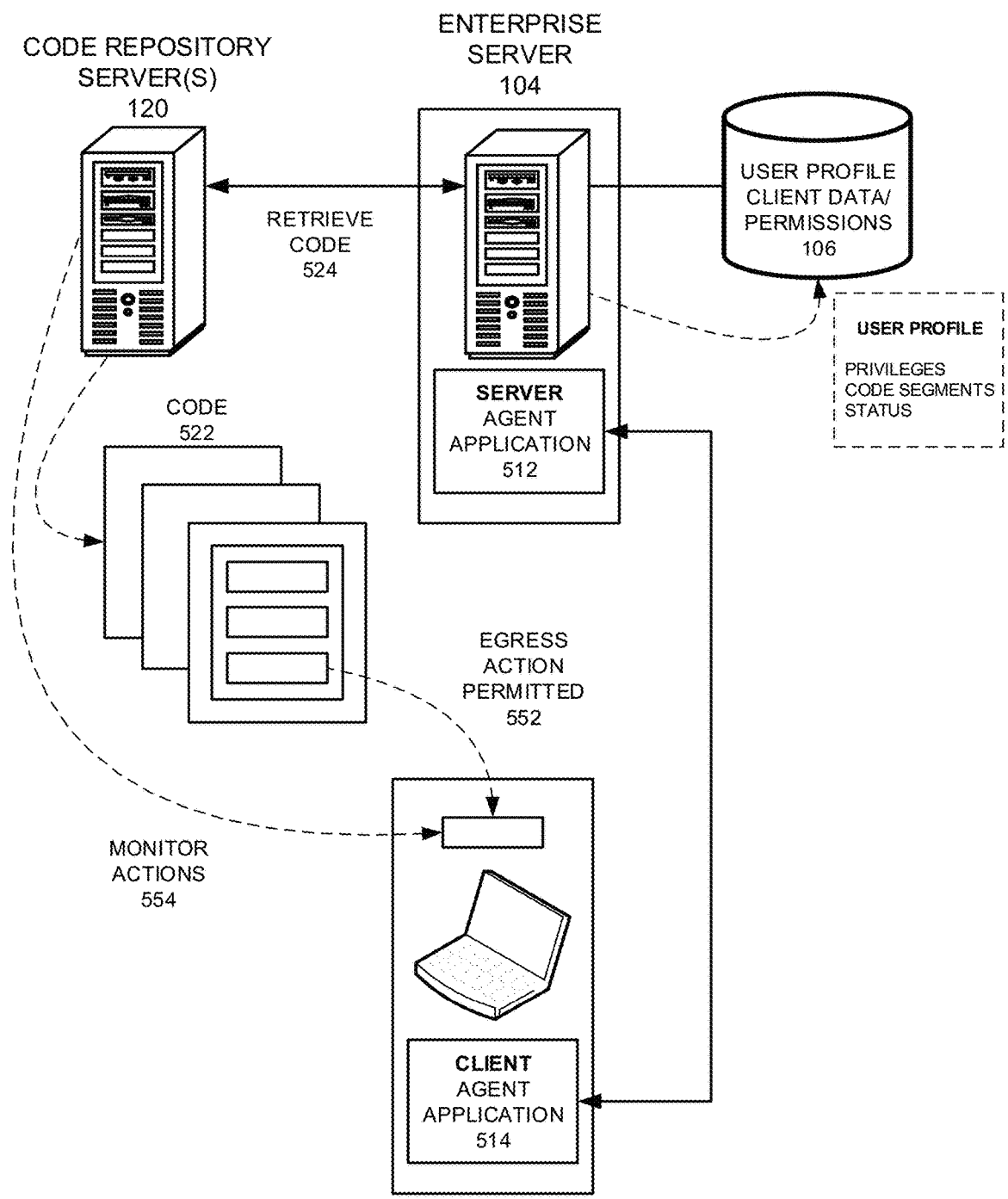
FIG. 5B illustrates an example network configuration for monitoring code egress and according to example embodiments.

FIG. 5B illustrates an example network configuration for monitoring code egress and according to example embodiments. Referring to FIG. 5B, the example 550 includes a scenario where the egress action is permitted 552. In this case, the user profile/user device is managed via a client agent application 514 which confirmed with the server agent application 512 that the client permissions permitted the egress code action. As the action is performed, via a code copy, code location modify operation, or similar egress operation, the client agent 514 flags the server agent 512 by sending a request for confirmation of such egress privileges. The confirmation process may include examining the code segment, code block, etc., which is in question and comparing it to the user profile for confirmation of the correction permissions/privileges. Once the egress action is permitted, the server(s) may monitor the actions 554 of the client device. The actions being monitored may be based on a time frame permitted for the egress of the code to the client device. For example, how long this data may be copied and stored temporarily on the client device before the egress operation is deemed invalid or disallowed. Once the time frame has matured, the server may not provide additional communication capabilities and the code can no longer be tied to any other code executables which could limit other testing or simulation code operations which require access to the core code or main executable files, and this would effectively revoke access.

Figure 5C:
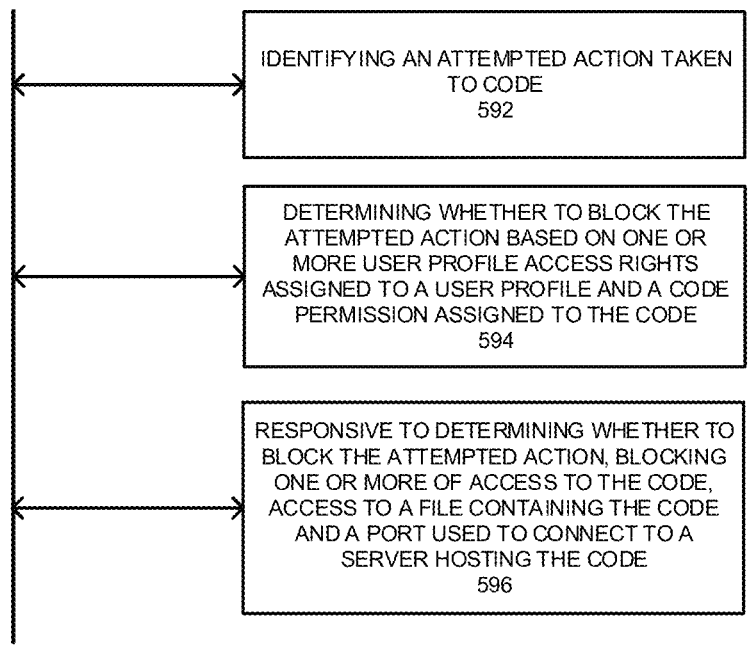
FIG. 5C illustrates an example flow diagram of a process for managing code egress attempts according to example embodiments.

FIG. 5C illustrates an example flow diagram of a process for managing code egress attempts according to example embodiments. Referring to FIG. 5C, the process 590 may include identifying an attempted action taken to code, such as code being accessed by a client device during a code access event 592, determining whether to block the attempted action based on one or more of user profile access rights assigned to a user profile and a code permission assigned to the code 594, and responsive to determining whether to block the attempted action, blocking one or more of access to the code, access to a file containing the code and a port used to connect to a server hosting the code 596. The process may also include identifying the code being accessed and identifying the file containing the code being accessed. The blocking of access to the file may include identifying a metadata tag stored in the file and applying a metadata tag rule to the file during the attempted action. The metadata tag may be a limiting rule that is enforced when the code is accessed. The metatag may specify no egress type actions and thus when those are attempted on a code segment having the metadata tags which limit those actions, the egress operations may be blocked or at least enforced to identify whether the user profile has the correct credentials.

In general, code monitoring may include a server or devices which are configured to track instances of metadata or control data, such as: times, dates, location, user profiles, egress operations, copying, modifying, deleting, etc., associated with the code. For example, alerts may include secrets identified, such as tokens used, private data, egress actions, policy violations, unauthorized actions, new public and private repositories, which are identified as storing the code. The number of occurrences may be used to establish an acceptability/unacceptability threshold for action. For example, if the number of egress events for a period of time exceeds a threshold (T) of five, then the code may be locked from further access to all parties except for certain high-level administrators with advanced permissions/privileges. For example, if a copy of sensitive code is identified in five or more new locations within a defined period of time then an automated action may occur which prevents certain access and other functions until the matter is resolved. Another operation may be a repository identification process where the repositories storing the code are identified and are required to be approved to alleviate or remove an unauthorized action.

One example of a period of time used as a basis for code security may include 48 hours, one week, etc., that the code is tracked, monitored, and the results are compiled and compared to acceptability thresholds to determine if certain users are required to have their access privileges revoked. If the violation is identified based on unacceptable storage locations or other criteria (e.g., thresholds instances), then user rights of those having low-level rights or those who accessed the code during the period of analysis may lose their access privileges. Another criteria may be counting the number of duplications, such as clones created and where the clones are stored.

The one or more automated actions taken by the server code management application may include, upon identifying a rule violation, one or more of revoking user profile code access permissions, locking access to the sensitive code segments, and preventing code egress operations. The code egress operations may include one or more of moving the code, copying the code and storing the code in a new data storage location or other actions. One type of unacceptable egress operation may be the copying of data to a thumb drive, downloading a file to a remote storage location, 'desktop' device location, etc. The type of egress action may be a copy action which is identified during the attempted code event. Yet another type of egress action may be a copy action performed prior to the discovery of the action. In this case, the libraries or other accessible links may be disabled to cause the copied code to be useless since references to exterior files and sources may be unobtainable after the remedial actions are taken once the code egress is discovered.

In general, code developers should be able to write and edit code but not remove the code. One approach may be blocking egress actions, for example, metadata can be monitored on a file, such as an attempted copy action of a file, that can be blocked as a data loss prevention tool. Another approach is to block the port used currently or normally used by the server during code access sessions. Also, the code does not have to be a file and instead could be a piece of code, such as a segment of text data. Also, a token may be used as an authentication factor, such as a username and password, and/or other information, such as a hardware address.

One approach may include adding context to the code files and data loss prevention (DLP) agents can use identify and use the context to enforce data loss prevention rules. Context may include repository name, author, and other custom information such as project name, confidentiality level, etc. The context can be applied as external attributes (metadata) information on the file. Another approach is to detect and enforce data loss similar to DLP agents but selectively for certain sensitive code segments and files. Another example may provide the ability to monitor and block code egress actions as a GITHUB type of pre-commitment and pre-push check. For example, blocking a push of an enterprise code segment or file to a public repository.

One example process may include identifying the code being accessed by identifying the file containing the code being accessed and identifying a metadata tag stored in the file and applying a metadata tag rule to the file during the attempted action in an effort to block access to the code. The metadata may require the user credentials be checked and then the action to check must identify a necessary credential. The process may also include determining whether the metadata tag is stored in the code responsive to the attempted action taken to the code and the action may cause the metadata tag to be retrieved and the permissions to be identified for the user profile. The process may also include monitoring code actions applied to the code by a user device during a code access session, identifying an egress code action attempted to the code as a trigger to perform one or more rules to the code actions. The process may also include applying a hash key to one or more code segments to create a hash value responsive to the egress code action and applying the hash key to the one or more code segments may be performed to create the hash value responsive to the egress code action and this includes applying the hash key to only a portion of the one or more code segments. The process may also include permitting code egress from a server associated with the code for a period of time, and when the period of time has lapsed, blocking subsequent code egress actions received.

Example embodiments provide ways to enforce software code protections and modifications to protect code from unauthorized sources and to track the use of the code on developer workstations. Further to code provenance and application of permissions/restrictions to the code, the code may be accessed and then annotated, tracked, modified, according to the code's history throughout the cloud and/or the enterprise environment and the user profiles/devices associated with the code events. Also, the code may be periodically traced to identify all such events which have occurred over a period of time which include accessing, modifying, egress code operations (e.g., moving code, copying code, etc.), testing, authorization to access the code, etc.

Figure 6A:
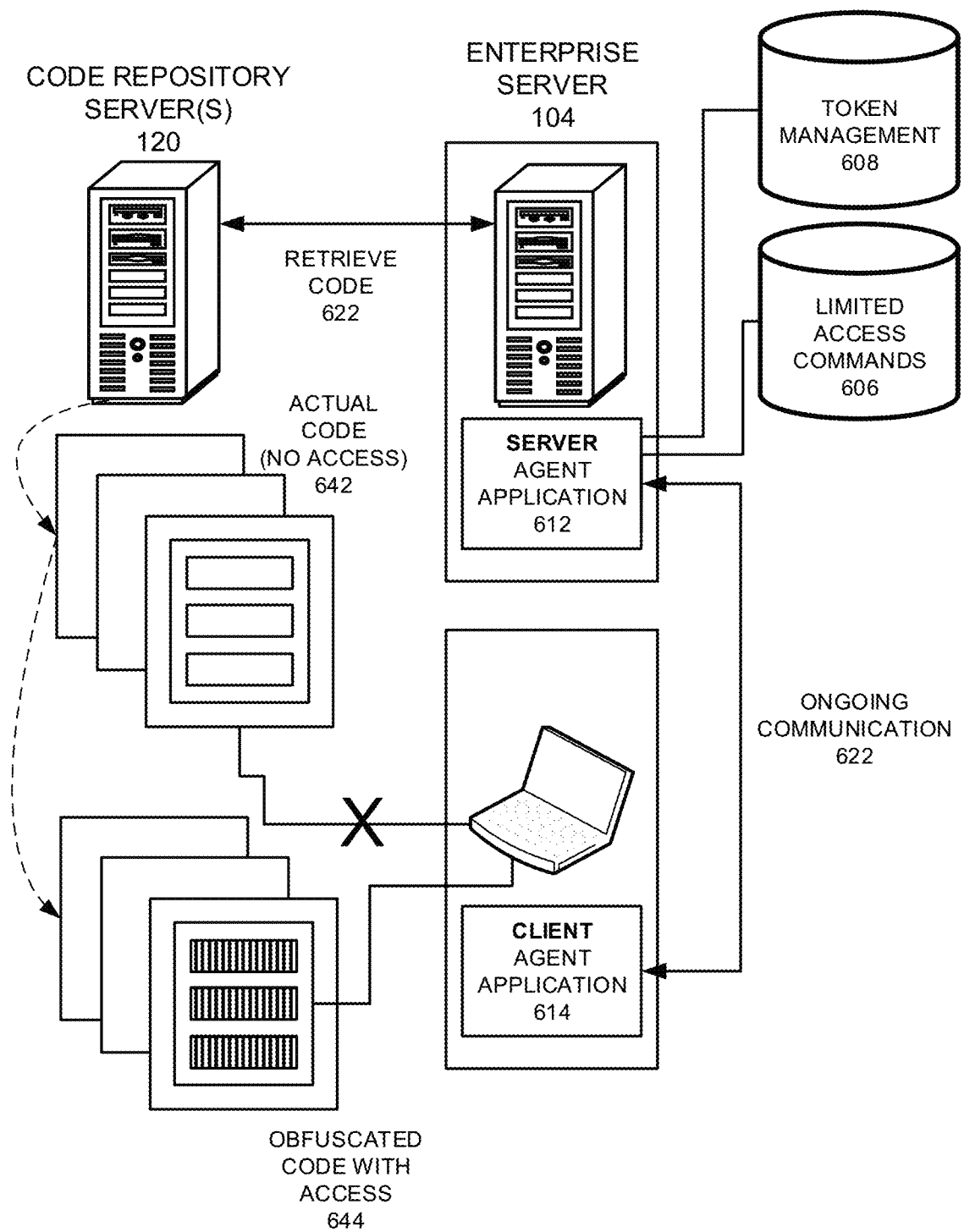
FIG. 6A illustrates an example network configuration for applying code security via token access according to example embodiments.

FIG. 6A illustrates an example network configuration for applying code security via token access according to example embodiments. Referring to FIG. 6A, an example code limited access management configuration 600 includes an enterprise server 104 as a server with access and/or storage that maintains code. When a user profile attempts to access code, the user profile of the client device may be retrieved from memory. The client agent application 614 may communicate to a server agent application 612 which monitors the client actions and reports the actions to an authority. Also, any violations to the rights of the client device and/or user profile may cause the privileges to be automatically revoked.

The enterprise server 104 may store the code in a code repository server 120, which may be local or at a remote site. When a code retrieval action 622 is received from a client device, the code 642 may be identified as a particular segment, group, file or set of files which are identified as having a particular designation, such as a restriction or open policy. Once the client profile is identified as having access to the code, a certain level of access may be applied. In this example, the user profile may have access to only a portion of the code, or the code may be required to be accessible but not viewable. The regular code in its regular state 642 may be inaccessible due to restrictions on the access of the client. The access may require ongoing communication via the agent application 614 and its continued communication 622 with the server agent application 112. The limited access commands 606 or list of acceptable commands may be stored in a list or reference directory of the agent application 612.

In one example, when a command is received and processed by the server agent 612, the command is screened to determine whether it is acceptable based on the limited access commands 606. The token of the client that is being used to provide code access may be revoked via a token management function 608, which is invoked if the command is identified as invalid or not within the scope of the client profile. In this example, the code may be accessible for testing purposes but not for modification, viewing, copying, etc. If the limited access privileges are applied, the server 120 may retrieve the code 622 and modify the code access by obfuscating the code's view 644 so the client device managed by a user cannot view the code, however, the code directory may be accessible to run a test cycle or perform other functions which related to the code.

Figure 6B:
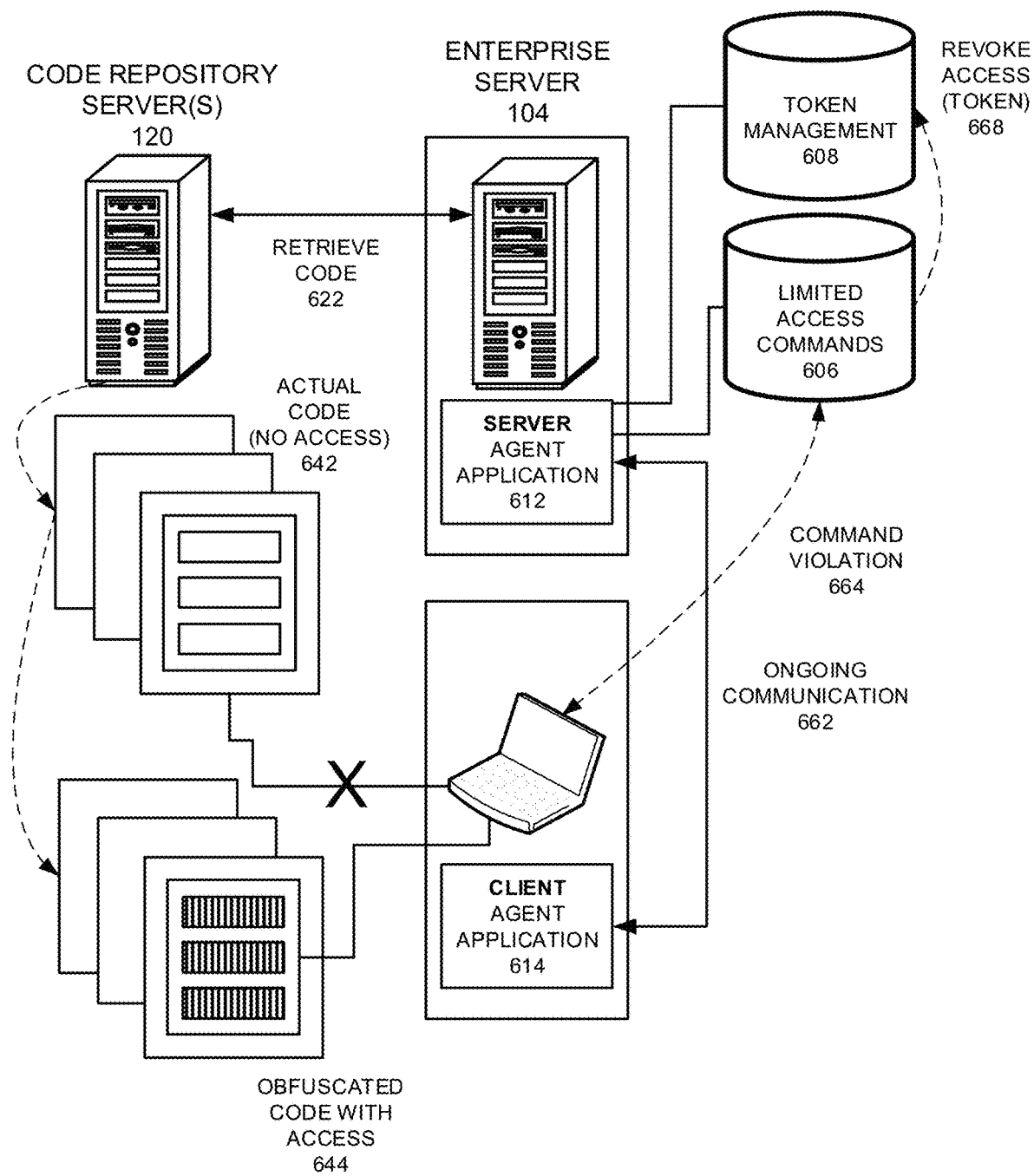
FIG. 6B illustrates an example network configuration for enforcing code security via token access according to example embodiments.

FIG. 6B illustrates an example network configuration for enforcing code security via token access according to example embodiments. Referring to FIG. 6B, the configuration 650 demonstrates that the corresponding portions of code may be identified and the entire procedure of testing the code may be logged. In the event that the client device is attempting to move, copy or duplicate the code, the egress attempt or other command violation 664 is identified by the agent and the action may be blocked by revoking 668 the token. For example, when a client device attempts to copy the code from a server, such as by a client device and profile that has test only permissions but not permission to remove the code, one approach is to block the egress action. Metadata can be monitored in association with a data file, such as an attempted copy action of a file, that can be blocked as a data loss prevention operation. The metadata may be a log of actions taken, such as an egress action. The servers 120/104 can then audit the metadata to identify whether a violation occurred and whether action to revoke the token is necessary. Another approach may be to block the port used to attempt the egress action. The port may be a client device port, a network device port, a server port, etc. Also, the code does not have to be a file and instead could be a portion of code inside a file that includes various code portions.

Figure 6C:
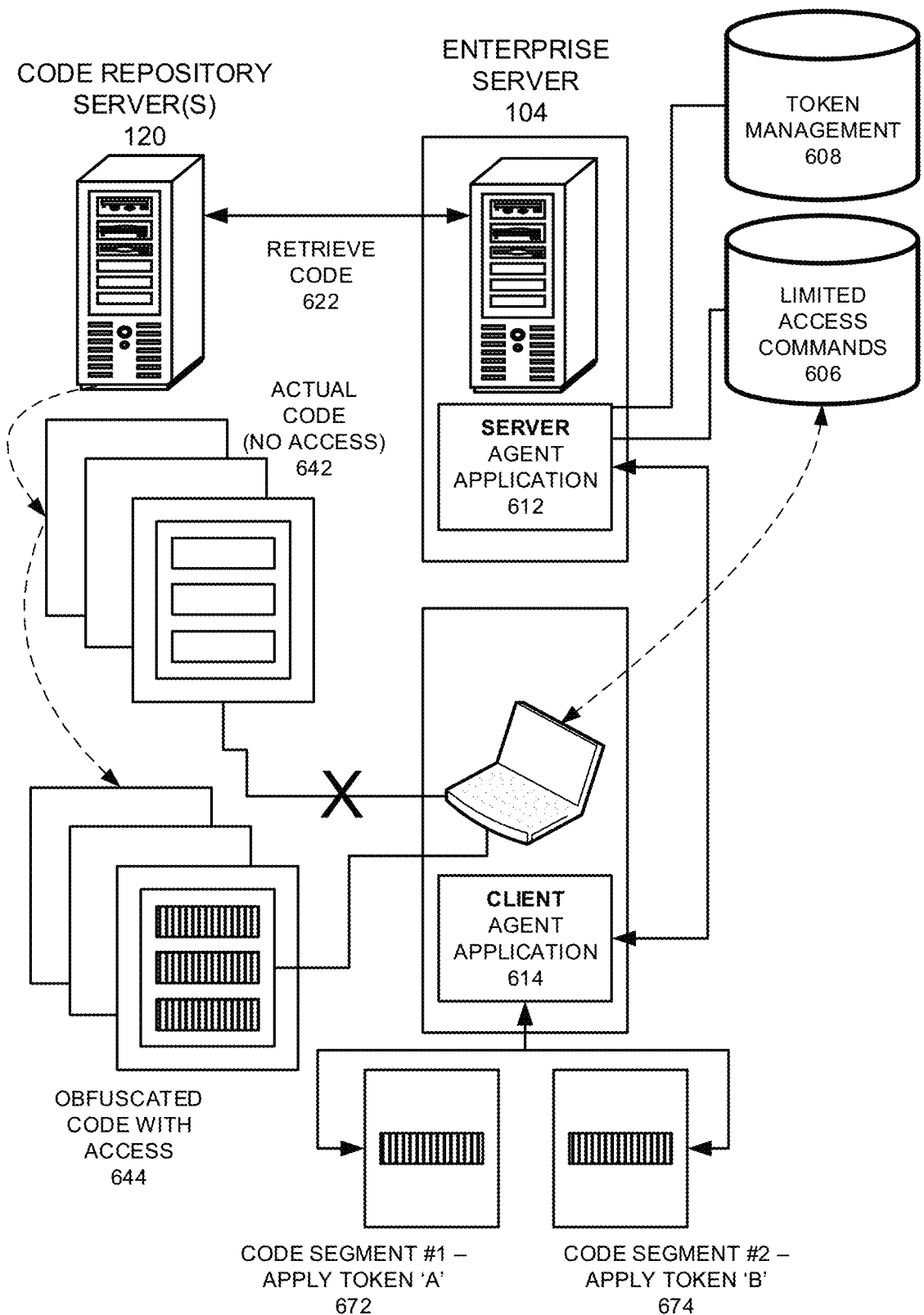
FIG. 6C illustrates an example network configuration for applying different tokens to different code segments according to example embodiments.

FIG. 6C illustrates an example network configuration for applying different tokens to different code segments according to example embodiments. Referring to FIG. 6C, the example configuration 670 includes a process where a first token 'A' is applied to a first portion of the code 672 and a second token is applied 'B' to a second portion of the code 674. As the client device accesses a first code portion a first token may be assigned. Each portion of the code accessed may invoke a new code segment being accessed and a new token applied. In this example, the code remains hidden from view due to the obfuscation of the code, however, access to perform limited actions such as execution and testing. When a token is revoked, the access to the code that was accessed for that token is also revoked.

Figure 6D:
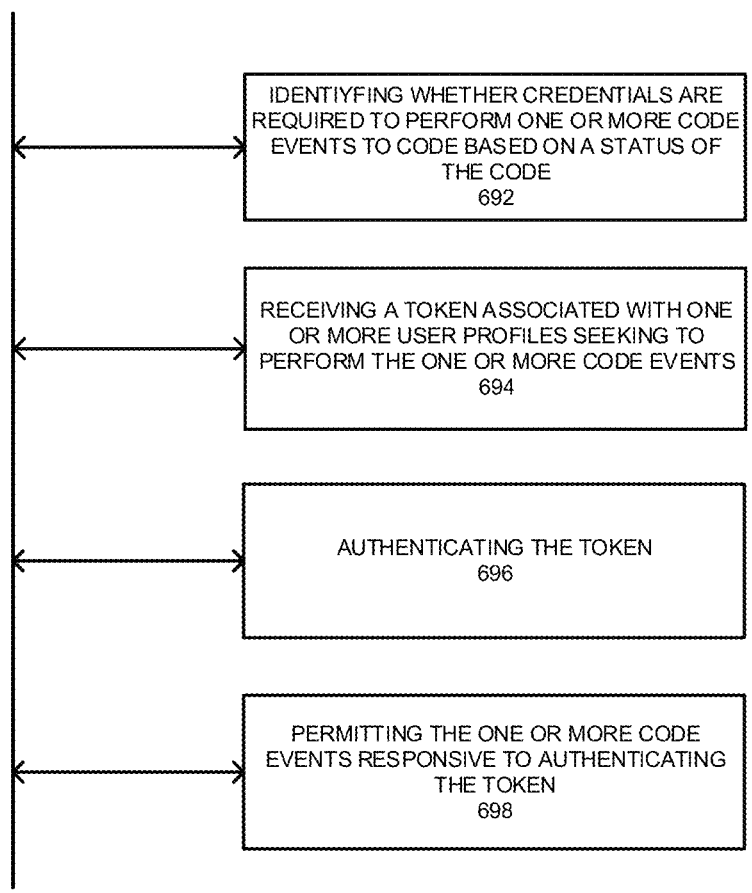
FIG. 6D illustrates an example flow diagram of a process for enforcing token access according to example embodiments.

FIG. 6D illustrates an example flow diagram of a process 690 for enforcing token access according to example embodiments. Referring to FIG. 6D, the process may include identifying a user profile with limited access privileges to code and identifying whether credentials are required to perform one or more code events to code based on a status of the code 692, and receiving a token associated with one or more user profiles seeking to perform the one or more code events 694, which may be performed during a code access event or after the event. The token will need to be authenticated by the server application or other entity responsible for verifying the token authenticity. The process may also include permitting the one or more code events responsive to authenticating the token 698. The process may also include identifying the one or more user profiles participating in a code development session, forwarding a request for the token to one or more devices associated with the one or more user profiles, and monitoring one or more code events to identify the token needed. The process may also include monitoring the one or more code events and determining sensitive code is included in the one or more code events, such as code identified by metadata or by other data attributes of the code and identifying the one or more user profiles has limited access privileges to the code, the process may also include comparing received commands to permitted commands associated with the limited access, and revoking the token associated with user profile responsive to identifying the received command is not permitted. The method may also include applying the token to a first code segment, identifying a code event associated with a different code segment, and receiving a second token and the second token is authenticated and applied to the different code segment.

In general, code monitoring may include a server or devices which are configured to track instances of metadata or control data, such as: times, dates, location, user profiles, egress operations, copying, modifying, deleting, etc., associated with the code. For example, alerts may include secrets identified, such as tokens used, private data, egress actions, such as policy violations, unauthorized actions, new public and private repositories, which are identified as storing the code. The number of occurrences may be used to establish an acceptability/unacceptability threshold for action. For example, if the number of egress events for a period of time exceeds a threshold (T) of five, then the code may be locked from further access to all parties except for certain privileged administrators. For example, if a copy of sensitive code is identified in five or more new locations within a defined period of time then an automated action may occur which prevents certain access and other functions until the matter is resolved. Another operation may be a repository identification process where the repositories storing the code are identified and are required to be approved to alleviate or remove an unauthorized action.

One example of a period of time may include 48 hours, one week, etc., that the code is tracked and the results are compiled and compared to acceptability thresholds to determine if certain users are required to have their access privileges revoked. If the violation is identified based on unacceptable storage locations or other criteria (e.g., thresholds instances), then user rights of those with low-level rights or those who accessed the code during the period of analysis may lose their access privileges. Another criteria may be counting the number of duplications, such as clones created and where the clones are stored.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
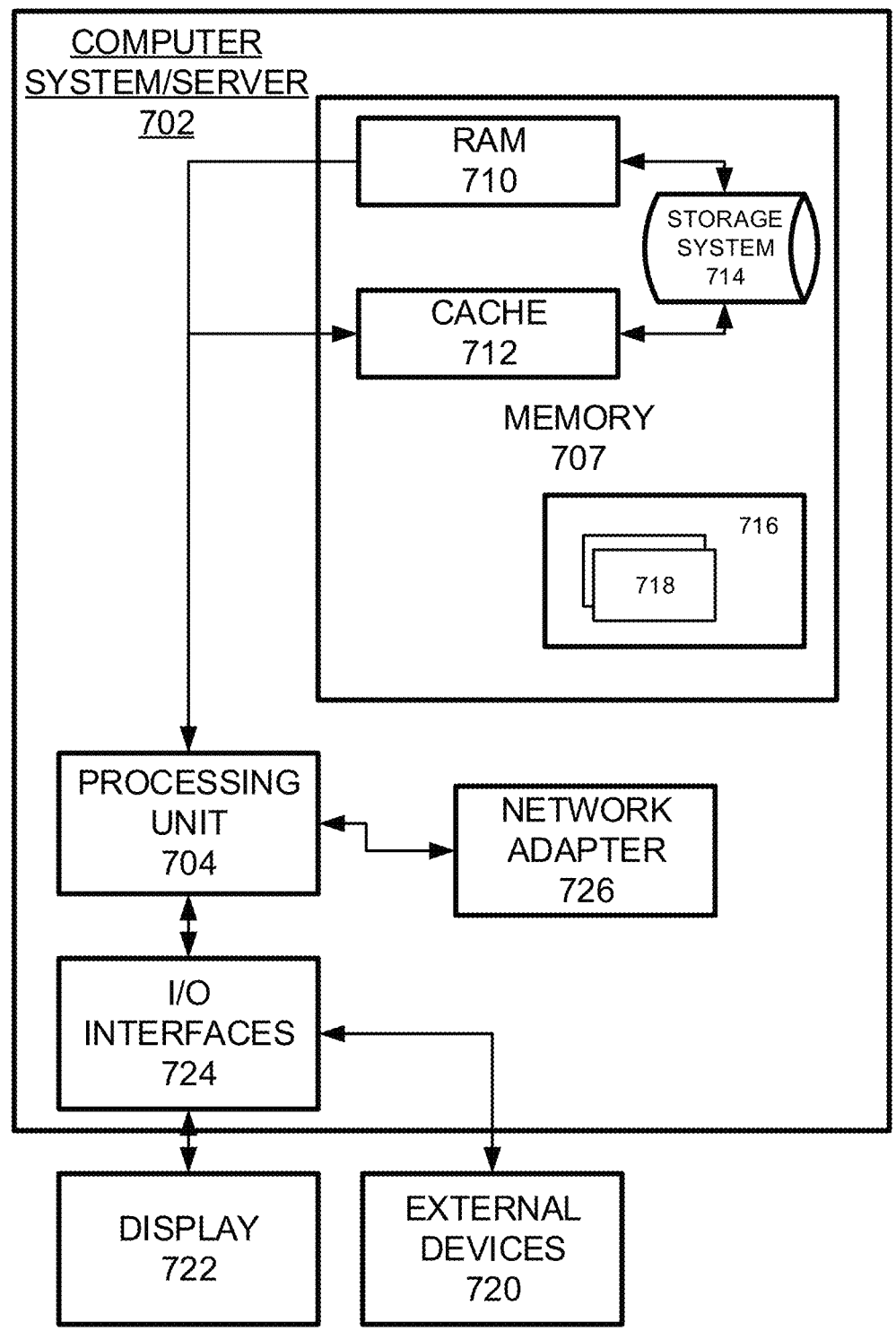
FIG. 7 illustrates an example network entity device configured to store instructions, software, and corresponding hardware for executing the same, according to example embodiments of the present application.

FIG. 7 is not intended to suggest any limitation as to the scope of use or functionality of embodiments of the application described herein. Regardless, the computing node is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 via a I/O adapter 724, such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724 of the adapter 726. Still yet, computer system/server 702 can communicate with one or more networks such as a local area network (LAN), a general wide area network (WAN), and/or a public network (e.g., the Internet) via network adapter. As depicted, adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

While example embodiments have been particularly shown and described, it will be understood by those skilled in the art that various changes in form and details may be made therein without departing from the scope of the embodiments encompassed by the appended claims.

What is claimed is:

1. A method comprising:
identifying an attempted action taken to code;
determining whether to block the attempted action taken to the code based on user profile access rights assigned to a user profile associated with the attempted action taken to the code and a code permission assigned to the code which limits modifications and an egress action permitted to be made to the code; and
blocking one or more of access to the code, access to a file containing the code, and a port used to connect to a server hosting the code when the attempted action taken to the code comprises an egress action and violates the code permission assigned to the code limiting modifications.

2. The method of claim 1, further comprising:
identifying the code being accessed by identifying the file containing the code being accessed.

3. The method of claim 1, further comprising:
identifying a metadata tag stored in the file containing the code and applying a metadata tag rule to the file containing the code during an attempted action to block access to the code.

4. The method of claim 3, further comprising:
determining whether the metadata tag is stored in the code responsive to the attempted action taken to the code.

5. The method of claim 1, further comprising:
monitoring code actions applied to the code by a user device during a code access session;
identifying an egress code action attempted to the code; and
applying a hash key to one or more code segments to create a hash value responsive to the egress code action.

6. The method of claim 5, wherein applying the hash key to the one or more code segments to create the hash value responsive to the egress code action comprises applying the hash key to only a portion of the one or more code segments.

7. The method of claim 1, further comprising:
permitting code egress from a server associated with the code for a period of time; and
when the period of time has lapsed, blocking subsequent code egress actions received.

8. An apparatus comprising:
a processor configured to:
identify an attempted action taken to code;
determine whether to block the attempted action taken to the code based on user profile access rights assigned to a user profile associated with the attempted action taken to the code and a code permission assigned to the code which limits modifications and an egress action permitted to be made to the code; and
block one or more of access to the code, access to a file containing the code, and a port used to connect to a server hosting the code when the attempted action taken to the code comprises an egress action and violates the code permission assigned to the code limiting modifications.

9. The apparatus of claim 8, wherein the processor is further configured to:
identify the code being accessed by identifying the file containing the code being accessed.

10. The apparatus of claim 8, wherein the processor is further configured to:
identify a metadata tag stored in the file containing the code and apply a metadata tag rule to the file containing the code during an attempted action to block access to the code.

11. The apparatus of claim 10, wherein the processor is further configured to:
determine whether the metadata tag is stored in the code responsive to the attempted action taken to the code.

12. The apparatus of claim 8, wherein the processor is further configured to:
monitor code actions applied to the code by a user device during a code access session;
identify an egress code action attempted to the code; and
apply a hash key to one or more code segments to create a hash value responsive to the egress code action.

13. The apparatus of claim 12, wherein applying the hash key is, applied to the one or more code segments to create the hash value responsive to the egress code action comprises applying the hash key to only a portion of the one or more code segments.

14. The apparatus of claim 8, wherein the processor is further configured to:
permit code egress from a server associated with the code for a period of time; and
when the period of time has lapsed, block subsequent code egress actions received.

15. A non-transitory computer readable storage medium configured to store instructions that, when executed, cause a processor to perform:
identifying an attempted action taken to code;
determining whether to block the attempted action taken to the code based on user profile access rights assigned to a user profile associated with the attempted action taken to the code and a code permission assigned to the code which limits modifications and an egress action permitted to be made to the code; and
blocking one or more of access to the code, access to a file containing the code, and a port used to connect to a server hosting the code when the attempted action taken to the code comprises an egress action and violates the code permission assigned to the code limiting modifications.

16. The non-transitory computer readable storage medium of claim 15, wherein the processor is further configured to perform:
identifying the code being accessed by identifying the file containing the code being accessed.

17. The non-transitory computer readable storage medium of claim 15, wherein the processor is further configured to perform:
identifying a metadata tag stored in the file containing the code and applying a metadata tag rule to the file containing the code during an attempted action to block access to the code.

18. The non-transitory computer readable storage medium of claim 17, wherein the processor is further configured to perform:
determining whether the metadata tag is stored in the code responsive to the attempted action taken to the code.

19. The non-transitory computer readable storage medium of claim 15, wherein the processor is further configured to perform:
monitoring code actions applied to the code by a user device during a code access session;
identifying an egress code action attempted to the code; and
applying a hash key to one or more code segments to create a hash value responsive to the egress code action.

20. The non-transitory computer readable storage medium of claim 19, wherein applying the hash key to the one or more code segments to create the hash value responsive to the egress code action comprises applying the hash key to only a portion of the one or more code segments.

* * * * *